United States Patent
Horrigan et al.

(10) Patent No.: US 6,493,682 B1
(45) Date of Patent: Dec. 10, 2002

(54) OPTIMAL ORDER CHOICE: EVALUATING UNCERTAIN DISCOUNTED TRADING ALTERNATIVES

(75) Inventors: Holly T. Horrigan, Raleigh, NC (US); John K. Wald, Hoboken, NJ (US)

(73) Assignee: Pendelton Trading Systems, Inc., Hoboken, NJ (US)

( * ) Notice: Subject to any disclaimer, the term of this patent is extended or adjusted under 35 U.S.C. 154(b) by 0 days.

(21) Appl. No.: 09/396,647

(22) Filed: Sep. 15, 1999

Related U.S. Application Data

(60) Provisional application No. 60/100,381, filed on Sep. 15, 1998.

(51) Int. Cl.$^7$ ............................................. G06F 17/60
(52) U.S. Cl. .............................. 705/36; 705/36; 705/35; 705/37
(58) Field of Search ............................... 705/35, 36, 37

(56) References Cited

U.S. PATENT DOCUMENTS 5,819,237 A * 10/1998 Garman ........................ 705/36
6,078,904 A *  6/2000 Rebane ........................ 705/36

FOREIGN PATENT DOCUMENTS

WO      WO 01/09698 A2 *  8/2001

OTHER PUBLICATIONS

Patrick Sandas, Estimating Models of Price Formation in Pure Limit Order Markets, Dec. 1998, Doctoral Dissertation, pp. 1–7.*
Tradeworx Press Releases to Sep. 30, 1999 and TREQ description.*
Figlewski, Stephen, 1997, Forecasting volatility, *Financial Markets, Institutions & Instruments*, 6(1), 1–88.
Harris, Lawrence and Joel Hasbrouck, 1996, Market vs. limit orders: The SuperDot evidence on order submission strategy, *Journal of Financial and Quantitative Analysis*, 31, 213–231.
Hausman, J., A. Lo, and C. MacKinlay, 1992, An ordered profit analysis of transaction stock prices, *Journal of Financial Economics*, 31, 319–379.
Lin, Ji–Chai and Michael S. Rozeff, 1994, Variance, return, and high–low price spreads, *The Journal of Financial Research*, 17(3), 301–319.
Merton, Robert C., *Journal of Economic Theory*, 3, 373–413.
Pratt, John W., 1964, Risk aversion in the small and in the large, *Econometrica*, 32, 83–97.
Simaana, Yusif, Daniel G. Weaver, and David K. Whitcomb, 1998. The Quotation Behavior of ENCS and Nasdaq Market Makers, Fordham University working paper.

* cited by examiner

*Primary Examiner*—Vincent Millin
*Assistant Examiner*—Charles R. Kyle
(74) *Attorney, Agent, or Firm*—McDonnell Boehnen Hulbert & Berghoff

(57) ABSTRACT

The present invention provides a method for determining whether to execute an order (or list of orders) immediately, or delay execution in exchange for a possible price savings. The method's generality enables the investor to optimize order decisions given individual beliefs about expected security returns and variance, risk aversion, and portfolio investment goals. Starting from an expected utility framework, the method maximizes the expected gains associated with trading. The method encompasses the case in which the investor plans to trade the security within a specified trading window as well as the case in which trading occurs only at attractive prices. Additionally, under the assumption of constant absolute risk aversion, the method resembles a traditional mean-variance analysis commonly used in equity portfolio management. The method also generalizes to handle the case of multiple orders and enables an investor to consider an order strategy taking overall portfolio risk into account. The method also can be used in conjunction with dynamic cost control techniques.

The method of the invention is the first such method to consider the maximization of gains in an order context as a function of both returns and the probability of the order being executed. This method is also unique in that it simultaneously accounts for the opportunity costs and the adverse selection costs of using discounted, uncertain orders such as equity limit orders, POSIT® trades, equity principal order trading, etc.

31 Claims, No Drawings

OPTIMAL ORDER CHOICE: EVALUATING UNCERTAIN DISCOUNTED TRADING ALTERNATIVES

This application claims the benefit of U.S. Provisional Application No. 60/100,381, filed Sep. 15, 1998.

BACKGROUND OF THE INVENTION

1. Field of the Invention

The present invention relates to the field of securities trading and, in particular, to a method of determining when to place an order, subject to uncertain execution, in exchange for better execution prices, an example of which is limit order trading in the U.S. equity market.

2. Summary of the Related Art

An investor choosing to place a purchase limit order may not receive execution if the price rises, but will receive execution if the price falls sufficiently. The investor misses some of the gains and suffers more of the losses. However, in noisy or mean-reverting markets, limit orders may provide superior returns by reducing the costs of execution. Thus, limit order trading involves the risk of non-execution but also offers the promise of superior returns. Similarly, an investor placing an order on electronic crossing networks (ECN) such as POSIT® faces a similar tradeoff. The investor may receive superior trade performance but risks that the trade will not be executed.

Much of the current literature on order placement focuses on the decision of traders to place limit orders and the implications of this decision for the market's bid-ask spread. Clearly, understanding the structure of markets and the motivations of the market maker is essential, and there have been a number of important papers on this subject. However, another important segment of the financial community is the "buy side" of the market; investors attempting to trade optimally for their own account. (When we refer to investors, we contemplate traders acting as agents for investors, investors trading on their own behalf, and traders transacting proprietary inventory.) Very little has been written or produced which links the portfolio planning stage of investment with the trading process. We believe this methodology provides new insights into using limit orders optimally given portfolio characteristics and therefore has broad implications for investors.

While there is a sizeable background literature on limit orders, in contrast, the literature on trading with ECN's is almost nonexistent. In a recent working paper, Simaana, Weaver, and Whitcomb (1998) discuss ECN's and show that they reduce the average spread on NASDAQ traded stocks. No literature exists on when investors should choose ECN orders vs. market or limit orders. We are unaware of any commercially available products that perform this analysis.

The literature on optimal order strategies includes Cohen, Maier, Schwartz, and Whitcomb (1981), who show that a non-trivial bid-ask spread will exist in securities markets, that limit orders become more attractive if the bid-ask spread increases, and also that the probability of limit orders executing does not approach one as the limit order price approaches the market price.

A number of papers also address the limit order book in an equilibrium context. These include Glosten (1994), who examines the market produced by an electronic limit order book and shows that it provides a minimum spread and does not invite competition from a dealer market. Chakravarty and Holden (1995) also theoretically examine whether traders wish to submit market or limit orders in an equilibrium setting.

Harris and Hasbrouck (1997) detail the type of orders and participants on the NYSE, and Keim and Madhavan (1997) provide a summary of the evidence on trading costs and their economic significance. Copeland and Galai (1983) show how a dealer's decision to set quotes is similar to writing a put and call option to an informed trader, and how an option analysis can produce realistic bid-ask spreads. While our analysis focuses on a possibly risk averse investor placing a limit order rather than a risk neutral dealer setting quotes, the basic costs and benefits of our analysis are similar to Copeland and Galai (1983). Because placing a limit order is analogous to writing an option to the market (or dealer), the fundamental expectations equations we present are consistent with Copeland and Galai (1983).

The prior art does contain several papers that discuss methods for finding optimal placement strategies, and several papers that discuss related issues. The papers that discuss optimal placement strategies include Handa and Schwartz (1996), Angel (1994), Harris (1998), and Foucault (1999). None of these papers models risk-averse investors, a feature that allows us to generate more realistic implications as well as tying the order placement decision with overall portfolio risk. These papers also include a number of restrictive assumptions that decrease the realistic applicability of their work, and they do not fully provide a method for estimating and using the joint distribution of returns and order fill rates.

Handa and Schwartz (1996) examine the returns from placing a limit order depending on the arrival of liquidity or informed counterparty traders. Handa and Schwartz (1996) also empirically examine the returns for executed and non-executed limit orders. However, whereas Handa and Schwartz (1996) as well as Copeland and Galai (1983) and others classify traders as informed or uninformed, and the expected costs and gains are evaluated for a single-security transaction by a risk neutral trader, the method of the present invention represents the investor's information in terms of expected return and variance of expected return, rather than with the dichotomous informed/uninformed framework. This permits more flexibility in quantifying "information," and it enables the investor to examine the relation between expected returns, execution probabilities, and returns to various strategies.

Handa and Schwartz (1996) also do not fully model security returns and fill probabilities as correlated random variables, thus their conclusions are markedly different from those given by the present invention. For instance, they find that in the "forced" case, where investors plan on purchasing the security by the close of the trading window, a limit order strategy is always inferior to a market order strategy. This result is in direct contrast to the results of the present method.

Angel (1994) models the limit order decision under the assumption that orders arrive as a Poisson process, an assumption which is both unrealistic and unnecessary to the more general method of our invention. Our model is thus less restrictive than the Angel model in that it does not depend on a particular order generating process. Harris (1998) considers a dynamic model but again under strict discrete assumptions as to investor's information and as to the pricing process. While Harris (1998) and Angel (1994) solve for optimal strategies, the limitations of their assumptions (as well as the fact that they do not consider risk-aversion), makes their models more interpretable as examples of solutions under certain cases.

Foucault (1999) uses a game theoretic model to examine the number of limit and market orders given in a limit order market. His results are partly driven by assuming a trading period of unknown length and also that in equilibrium traders are indifferent between placing limit or market orders. One of Foucault's findings is that limit orders are less likely to be executed if volatility is high. The findings of our empirical work are in contrast to this result of his model. Our method shows that as volatility increases, execution probabilities increase, and frequency of limit order placement decreases because the desirability of limit orders decreases.

In related work, Lo, MacKinlay, and Zhang (1997) present a survival probability model of limit order execution time using industry limit order data. While survival times are an important part of the limit order decision, this approach does not show how investors can optimize limit order placement.

Bertsimas and Lo (1997) present an interesting theoretical analysis of dynamic execution cost control. Their paper demonstrates an approach to optimally segment a large block order into smaller blocks, thereby minimizing trading costs. However, they do not address whether to place those pieces as limit or market orders or on what exchange.

All publications recited in this specification are hereby incorporated by reference in their entirety.

SUMMARY OF THE INVENTION

The present invention provides a method for determining whether to execute an order (or list of orders) immediately, or delay execution in exchange for possible price savings. The method's generality enables the investor to optimize order decisions given individual beliefs about expected security returns and variance, risk aversion, and portfolio investment goals. Starting from an expected utility framework, the method maximizes the expected gains associated with trading. The method encompasses the case in which the investor plans to trade the security within a specified trading window as well as the case in which trading occurs only at attractive prices. Additionally, under the assumption of constant absolute risk aversion, the method resembles a traditional mean-variance analysis commonly used in equity portfolio management. The method also generalizes to handle the case of multiple orders and enables an investor to consider an order strategy taking overall portfolio risk into account. The method also can be used in conjunction with dynamic cost control techniques.

In its most basic form, the present method enables an investor to find an optimal order strategy based on a straightforward set of inputs. One example of a finished, integrated product employing the method of the invention would be a program into which the user identifies the securities and amounts he or she wants to trade, the trading horizon, and whether they are buying, selling, or selling short. The investor could then input additional information, such as their belief in the security's expected returns or in the security's expected volatility. If these were not input, the program may have additional more standard features to estimate them. For example, the expected returns over a short time period may be forecast equal to zero on average, and the expected volatility may be estimated by a variety of tools (see Figlewski, 1997). Several additional features and options of the program would typically be provided, and these are filly described below.

The method of the invention can advantageously account for a number of factors, including risk aversion, which has a small but visible impact on optimal order choice, and price volatility. Higher volatility increases the probability of fill, but also implies larger adverse selection costs. Additionally, it allows for user specification of a trade time horizon, trade size, and is generalizable to a number of different trading techniques and securities, including, but not limited to, equity limit orders, POSIT® trading, INSTINET® trading, and other electronic network trading. For example, in POSIT® trading, an investor may decide between executing a trade list with certainty using a principal order, or they may opt for uncertain execution in the POSIT® system, in the hopes of achieving a discounted execution price.

The method of the invention is the first such method to consider the maximization of gains in an order context as a function of both returns and the probability of the order being executed. The prior art had not suggested this approach, and the results achieved thereby could not have been predicted a priori. Therefore, this method is also unique in that it simultaneously accounts for the opportunity costs and the adverse selection costs of using discounted, uncertain orders such as equity limit orders, POSIT® trades, equity principal order trading, etc.

Whereas Handa and Schwartz (1996) as well as Copeland and Galai (1983) and others classify traders as informed or uninformed, and the expected costs and gains are evaluated for a single-security transaction by a risk neutral trader, the method of the present invention represents the investor's information in terms of expected return and variance of expected return, rather than with the dichotomous informed/ uninformed framework. This permits more flexibility in quantifying "information," and it enables the investor to examine the relation between expected returns, execution probabilities, and returns to various strategies.

The method of the present invention is also unique in modeling the joint distribution between returns and order execution rates. While several papers evaluate expected gains using an estimated or theoretical probability of execution, the method of the present invention maximizes gains using a joint density function. In this manner, the invention enables the investor to quantify the adverse selection problem associated with uncertain order execution.

The invention also comprises a computer readable medium having stored thereon instructions for causing a central processing unit to execute one or more of the embodiments of the method of the invention. Also provided by the invention are data structures comprised of the data input and/or outputs required to practice the invention.

The foregoing merely summarizes certain aspects of the invention and is not intended, nor should it be construed, as limiting the invention in any manner. All publications recited in this specification are hereby incorporated by reference in their entirety.

DETAILED DESCRIPTION OF THE INVENTION

The present invention provides a method for determining whether or not to place an order which is subject to uncertain execution and at what discounted price, using a risk averse investor's expected utility maximization. We first develop the method based on an investor executing a single security and then demonstrate how the method is generalized to purchases and sales of multiple different securities. Finally, we demonstrate how to optimize order placement while taking the interaction between orders and currently held securities into account. Throughout, we detail methodologies which may be employed by the user to generate the user-inputs to the invention.

As a first step, consider a simple example involving an investor's purchase of a single equity security. The decision this investor faces is whether to place a limit order, and if so, at what discount from the current offer price. If the investor places a limit order, he/she will typically tell the broker to execute at the current market offering price less some small discount. For example, if the investor is purchasing 100 shares of IBM, and the offering price is 165.25, the investor may place a limit order to buy at 165.00. The order will only execute if sufficient volume of IBM trades at 165.00. Otherwise, all or part of the order will remain unexecuted. Alternatively, the investor can choose to trade aggressively and, depending on the size of the order, either place a market order or solicit a principal order from a broker. Using the same example, an aggressive investor would instruct the broker to buy at the market, and he/she could expect the order of 100 shares of IBM to execute with certainty at 165.25. If the order was for 500,000 shares, however, the investor could solicit a principal bid from a broker. In this case, the broker would purchase the 500,000 shares from the investor at a negotiated price, perhaps at 165.50, and the entire order would execute with certainty at 165.50. Both of these aggressive alternatives provide certainty in execution whereas the limit order does not. We introduce the concept of a "principal price" as the price at which an investor knows execution is certain. For a small order in a liquid security, the quoted offer price approximates the principal price for a buy. (More conservatively, we could assume that for a small buy order the principal price would be the current market offer price plus an eighth. Similarly, the conservative principal price for a limit sell order would be the market principal minus an eighth.) For a large, illiquid block order, a principal price would typically be solicited from a broker or dealer and be based on market price plus some mark-up, though many variations on this concept can exist. (Madhavan and Cheng (1997) analyze the "upstairs" market for principal orders and suggest it may exist partly to provide a known execution price to large investors.)

The choice of "principal price" is a user-supplied input. For our examples, we use the quoted market price as the principal price, as this is an appropriate choice for small, liquid equity orders, consisting of less than 20% of the day's share volume. Other values may be substituted for other types of trading. For example, a principal order price, solicited from a broker, may be used as the principal price for a large block of stock being traded at a discount on POSIT®, where its execution is uncertain.

At first, assume that the investor faces a simple decision—either buy the security with certainty at the principal price, or place an order for that security at some discount from the principal price and hope for full or partial execution. If a principal order is placed, we assume it is executed at the start of the trade period at time t, at the current principal price. At the end of the trade period, at time t+1, performance is evaluated based on a terminal valuation price. The foregoing assumptions are useful for developing the present method but do not limit the method. In other words, the method of the invention can be employed outside the scope of these assumptions. Our notation is as follows:

w=is the initial wealth of the investor, i.e., the total wealth of the investor's assets in the portfolio at time t;

$p_{a,t}$=principal purchase price of the security at the start of the trade period, adjusted for splits and dividends; (For equity securities, it is often convenient to maintain a database containing historic prices for various securities of interest. In order to compare prices over time, it is necessary to adjust prices for the occurrences of splits and dividends. For example, if stock XYZ is trading at 150.00 on Jan. 2, 1998, and then splits 2:1 effective Jan. 3, 1998, the number of outstanding shares of the issue doubles, and the price of the stock halves to 75.00. In order to calculate the return over this same period, it is necessary to adjust all the prices preceding the split by a factor of one-half. For dividends, an adjustment is necessary if ownership of the stock at some time between t and t+1, inclusive, implies that a dividend will be received. If a dividend will be received, the terminal price at t+1 must be increased by the dollar amount of the dividend.

$\tilde{p}_{m,t+1}$=terminal valuation price of the security at the end of the trade period, adjusted for splits and dividends. (In the examples presented herein we use the midpoint of the bid and ask. The principal, offer, or some other price may be substituted, however, according to user preference. In general, the terminal valuation price of the security as used in the invention can be any convenient price that reflects the value of the security at the end of the trade period in question.)

$\gamma$=the discount, in dollars, from the principal price at which the investor places the order. If $\gamma$=0, the investor is executing a principal order at the principal price with certainty of execution; the invention solves for the optimal level of $\gamma$.

$\tilde{x}(\gamma)$=A random variable equal to 1 if an order executes, and 0 otherwise. By definition, $\tilde{x}(0)$=1, and $E(\tilde{x}(\gamma_1)) \geq E(\tilde{x}(\gamma_2))$, if $\gamma_1 < \gamma_2$, where the function E is the expected value of the random variable. In another embodiment of the invention, $\tilde{x}(\gamma)$ is a continuous real number within the interval [0,1]. This embodiment of the invention accounts for situations wherein there is a partial execution of an order; and s is the number of shares of the security being traded. (If the user knows, a priori, that they will be trading small lots of liquid securities, it is reasonable to make the approximation s=1 in all of the equations containing s. Consider again the example of an investor trading 100 shares of IBM. Because this security has such high volume, the sensitivity of optimal order discounts between order sizes of 100 to approx. 5,000 is insignificant, and it is likely that the approximation could be used successfully for even larger order sizes).

We consider two types of order decisions an investor may face, which we call the forced-execution and optional-execution cases. In the forced-execution case, an investor is constrained to execute the order by the end of the trading period. Thus, if the order does not execute, the investor executes the order at the principal price at time t+1, at $\tilde{p}_{a,t+1}$. We call this the "forced-execution" case, because execution takes place regardless of price level. An example of this type of investor might include the equity index fund manager, who wishes to rebalance a portfolio to track an index by the next day.

We refer to the second case as the "optional-execution" case; the investor does not necessarily execute the order if the order does not execute within time t. In this case, the investor only transacts at the relatively attractive discounted order prices. A user must select which scenario they wish to consider prior to running an optimization. Of course, it is possible to run multiple optimizations using different scenarios.

Using these conventions, we define the percentage return to a security as:

$$\tilde{r}_p = \frac{\tilde{p}_{m,t+1} - p_{a,t}}{p_{a,t}} \quad (1)$$

Note that in our example, where $p_{m,t+1}$ is defined as the midpoint of the bid and offer prices at time t+1, there is an inherent negative return approximately equal to half the percentage bid-ask spread. This convention is useful because it enables the investor to evaluate performance at the end of the trade period using not just changes in trade price but changes in spread as well.

In both the forced and optional-execution cases, the return to an executed purchase order is expressed as:

$$\tilde{r}_{\text{Filled\_P}} = \tilde{r}_p + \frac{\gamma}{p_{a,t}} \quad (2)$$

In equation (2), if $\gamma=0$, we assume that a principal order was placed and the return is identical to equation (1). If, however, the order does not execute, we need to define separate returns for the forced and optional-execution strategies. In the forced-execution case, the investor converts the unexecuted order to a principal order at time t+1. For a purchase, the forced-execution returns if the order does not execute are defined as:

$$\tilde{r}_{\text{Forced\_P}} = \frac{\tilde{p}_{m,t+1} - \tilde{p}_{a,t+1}}{p_{a,t}} \quad (3)$$

In our example, using equity limit orders, this term captures the bid-ask spread of the security. Notice that the higher price that the investor pays for the security is captured by the missed opportunity cost in not receiving $\tilde{r}_{Filled}$.

In the optional-execution case, unexecuted orders are not completed for the purposes of evaluating trade performance. In this scenario, the return to the unfilled purchase order is zero, $$\tilde{r}_{Optional\_P} = 0. \quad (4)$$

The method of the invention also contemplates and encompasses sale of a security. In the case of long sales, the return equations are:

$$\tilde{r}_{LS} = 0 \quad (5)$$

$$\tilde{r}_{\text{Filled\_LS}} = \tilde{r}_{LS} + \frac{\gamma}{p_{b,t}} \quad (6)$$

$$\tilde{r}_{\text{Forced\_LS}} = \frac{\tilde{p}_{b,t+1} - p_{m,t}}{p_{b,t}} \quad (7)$$

$$\tilde{r}_{\text{Optional\_LS}} = \frac{\tilde{p}_{m,t+1} - p_{m,t}}{p_{b,t}} \quad (8)$$

where $\tilde{p}_{b,t}$ is the principal price at time t and $\tilde{p}_{b,t+1}$ is the principal price at time t+1.

In the case of a short sale, the returns are given by:

$$\tilde{r}_S = \frac{p_{b,t} - \tilde{p}_{m,t+1}}{p_{b,t}}; \quad (9)$$

$$\tilde{r}_{\text{Filled\_S}} = \tilde{r}_s + \frac{\gamma}{p_{b,t}}; \text{ and} \quad (10)$$

$$\tilde{r}_{\text{Forced\_S}} = \frac{\tilde{p}_{b,t+1} - \tilde{p}_{m,t+1}}{p_{b,t}}, \quad (11)$$

$$\tilde{r}_{Optional\_S} = 0. \quad (12)$$

As used herein, the subscript "Optional" indicates the associate parameter to be employed is that for the optional execution case, the subscript "Forced" indicates the associate parameter to be employed is that for the forced execution case, and the additional subscripts P, S, and LS further indicates purchase, short sale, and long sale scenarios, respectively. Thus, for example, where a general equation employs $\tilde{r}_{Forced}$, it is understood that one of $\tilde{r}_{Forced\_P}$, $\tilde{r}_{Forced\_S}$, or $\tilde{r}_{Forced\_LS}$ are to be employed depending on whether the investor is considering, respectively, a purchase, short sale, or long sale of a security.

Given these definitions, the method uses the general utility function of gains to an order, which is expressed in terms of a small dollar risk to initial wealth. Starting with the forced-purchase scenario, we solve for the certainty equivalent associated with the trade risk. After developing the simplest case, we show how the model can be extended to include more complex risks, including multiple asset orders and a risky wealth portfolio.

Initially, assume that w has no risky component, and zero returns associated with it. An amount equal to the current principal price, $p_{a,t}$ for a purchase is set aside from w. (The solution is equivalent for sale orders, simply by substituting the appropriate returns equations.) The investor then submits an order at $p_{a,t}-\gamma$ (or a principal order if $\gamma=0$).

Generally, the return on a security, $\tilde{r}_w$, at time t+1 is given by $$(r_w)_j = \frac{(p_{m,t+1})_j - (p_{a,t})_j}{(p_{a,t})_j} \quad (13)$$

In a general embodiment of the invention, the investor maximizes terminal wealth, which is the solution to the equation:

$$\max_\gamma EU(W) = \quad (14)$$
$$EU\{\tilde{r}_{Filled}p_{a,t}s\tilde{x}(\gamma) + \tilde{r}^\dagger p_{a,t}s(1-\tilde{x}(\gamma)) + (1+\tilde{r}_w)w_{non-trade} + w_{trade}\}$$

where the function EU represents the expected value of the utility function U at time t+1. $w_{non-trade}$ and $w_{trade}$ are defined below, and $w=w_{non-trade}+w_{trade}$. Under the assumption of $\tilde{r}_w=0$, equation (14) simplifies to:

$$\max_\gamma EU(W) = EU\{\tilde{r}_{Filled}p_{a,t}s\tilde{x}(\gamma) + \tilde{r}^\dagger p_{a,t}s(1-\tilde{x}(\gamma)) + w\} \quad (15)$$

In equations (14) and (15) the first two terms on the right together are the "gains," $\tilde{g}$, which is the risky portion of the investor's problem:

$$\tilde{g} = \tilde{r}_{Filled}p_{a,t}s\tilde{x}(\gamma) + \tilde{r}^\dagger p_{a,t}s(1-\tilde{x}(\gamma)). \quad (16)$$

$\tilde{r}^\dagger$ in equations (14)–(16) is equal to $\tilde{r}_{Forced}$ in the forced execution case and $\tilde{r}_{Optional}$ in the optional execution case and, for the case in which the order is a sale, $p_{b,t}$ is substituted for $p_{a,t}$. The gains equation for the optional-execution case where the investor is not forced to purchase the security (i.e., the investor does not have to pay the principal price at time t+1) is:

$$\tilde{g}_{Optional} = \tilde{r}_{Filled} p_{a,t} \tilde{x}(\gamma) \quad (16)(a)$$

The function U is well known to those skilled in the art and can be found in most college level microeconomics texts like "Microeconomics Theory" (Hal R. Varian, 3$^{rd}$ Ed. Norton, New York, 1992). See also "Microeconomic Theory, Basic Principles and Extensions," Third edition, by Walter Nicholson, for a discussion on utility theory, the expected value of utility, and risk aversion. The $\tilde{r}_{Filled}$ and $\tilde{r}_{Forced}$ in equations (14)–(16)(a) (and throughout this specification) are those defined in equations (1)–(12), as appropriate, depending on whether the investor is considering buying or selling securities, and, when the order is a sale, $p_{a,t}$ in equations (14)–(16)(a) (and throughout the specification) is replaced with $p_{b,t}$.

Equation (14) states that the investor's terminal wealth can be broken into three components. (We ignore the returns to cash on uninvested funds for convenience; in our trials, the return to cash had an insignificant impact on optimal order choice. Because returns to cash are generally considered non-random, including cash involves the simple addition of a non-random constant to the returns equations.) The first term, $\tilde{r}_{Filled} p_{a,t} \tilde{x}(\gamma)$, captures the returns if the order is executed ($\tilde{x}(\gamma)=1$), or partially executed ($\tilde{x}(\gamma) \in (0,1)$). In this case, the investor receives the returns on the security plus the savings on the order discount, $\gamma$. Note that $\tilde{r}_{Filled}$ is also a function of $\gamma$. For the forced case, the second term, $\tilde{r}_{Forced} p_{a,t} s(1-\tilde{x}(\gamma))$, captures the returns if the order is not filled ($\tilde{x}(\gamma)=0$). In this case, the investor misses out on the potentially positive returns of the security when the order did not execute. Finally, w is the initial wealth of the investor.

Equation (14) can be optimized for maximum wealth, producing an optimal level of discount $\gamma$, using standard numerical techniques well known to those skilled in the art, such as those disclosed in "Numerical Recipes: The Art of Scientific Computing with IBM PC or Macintosh" (Press et al., Cambridge University Press 1996). In a simple embodiment, one can solve equation (14) for a variety of discrete, feasible discounts (e.g., from 0 to 3%) and select the one that maximizes the utility.

In another embodiment, the invention comprises maximizing the certainty equivalent, CE (Pratt, 1964), which is a function of $\tilde{g}$. Maximizing the certainty equivalent is approximately equal to maximizing utility (although maximizing the certainty equivalent is more convenient). In the general utility case, the certainty equivalent can be written (Pratt, 1964):

$$CE = E(\tilde{g}) - \frac{1}{2}\Psi(w)E(\tilde{g}^2) \quad (17)$$

$$\text{where} \quad \Psi(w) = \frac{U''(w)}{U'(w)}. \quad (18)$$

The certainty equivalent is derived from a Taylor expansion of the utility function around W. It is considered a reasonable simplification to make to this type of problem when the risk to the investor's wealth is small relative to total wealth. This simplification is not a necessary component of the invention, it is merely a convenience that a user may wish to employ. We compute the certainty equivalent because it provides a simple and familiar solution. In this embodiment, the invention comprises maximizing the certainty equivalent as a function of gains:

$$\max_{\gamma} CE = E(\tilde{g}) - \frac{1}{2}\Psi(w)E(\tilde{g}^2) \quad (19)$$

Equation (19) resembles the familiar mean-variance preference maximization problem used by many quantitative investors for equity portfolio selection. It differs from the typical mean-variance approach in the second term, $E(\tilde{g}^2)$. If $\tilde{g}$ were normally distributed or had mean zero, we could substitute the variance of $\tilde{g}$ for this term, however, it generally will not approximate a normal distribution.

The certainty equivalent can be maximized in equation (17) using standard numerical methods, such as those described in "Numerical Recipes," employing the expression for $\tilde{g}$ in equation (16) or (1 6)(a), as appropriate.

In a preferred embodiment, we assume constant absolute risk aversion with risk parameter $$\Psi(w) = \lambda. \quad (20)$$

Again, many other types of risk aversion may be considered by a user, including but not limited to risk neutrality (wherein $\Psi(w) = \lambda = 0$), increasing risk aversion, decreasing risk aversion, and others. See Varian (1992) for some commonly used utility functions and their associated levels of risk-aversion. Rewriting equation (17) using this assumption yields:

$$CE = E(\tilde{g}) - \frac{1}{2}\lambda E(\tilde{g}^2) \quad (21)$$

and in this embodiment the investor maximizes the certainty equivalent given in equation (21):

$$\max_{\gamma} CE = E(\tilde{g}) - \frac{1}{2}\lambda E(\tilde{g}^2) \quad (22)$$

While we solve the maximization problem by examining (19) or (22) directly, it is also useful to consider the first order condition:

$$\frac{\partial CE}{\partial \gamma} = 0 = E'(\tilde{g}) - \frac{1}{2}\Psi(w)E'(\tilde{g}^2) \quad (23)$$

where $\Psi(w)$ is given by either of equations (18) or (20). Note that changes in $\gamma$ affect equation (23) both through $\tilde{g}$ and also through the distribution over which the expectation is taken. Intuitively, the expected marginal profits from placing an uncertain order at a discount, captured by the first term of equation (23), must be weighed against the marginal risks taken, which are captured by the last term of equation (23). Therefore, as risk aversion, $\Psi(w)$, in equation (23) increases, the investor places more emphasis on the risks involved, and we would expect to see the percentage of principal orders increase. Note that in general, one cannot assume that $\tilde{x}(\gamma)$ is continuous in $\gamma$. Additionally, the investor may maximize over discrete values of $\gamma$, such as individual ticks away from the principal price in the case of equities, which currently trade in discrete tick amounts.

In our example of equity limit order trading, our results are in contrast with the existing art. For example, unlike Handa and Schwartz (1996), the method of the present invention does not imply that limit orders are always inferior to market orders in the forced execution case. Below we explore conditions under which limit orders do either better or worse than principal orders. We then also demonstrate how to find a maximum for equation (19) using an empirically estimated joint distribution for returns and limit orders fills.

Based on the foregoing formalism, the method can be expanded to handle more general trading problems faced by the investor. Rather than assuming he or she will be placing an order in a single security, consider the case where the investor has a list of N securities to transact. Now the investor is concerned not only with the correlations between $\tilde{r}$ and $\tilde{x}(\gamma)$, but also with each of the securities' returns and order executions, $\tilde{r}_n$ and $\tilde{x}_n(\gamma_n)$. Particularly, in the case of optional execution (16)(a), an investor transacting a list of securities may be left with a systematic bias due to only some orders being filled. For example, the existence of a correlation between $\tilde{r}$ and $\tilde{x}(\gamma)$ and known correlations between contemporaneous returns suggests this is an important consideration (see Fama and French (1993) for a recent analysis of systematic risk).

Let P, $\Gamma$, and $\tilde{X}$ be column vectors of length N, where P contains prices for each security times the number of shares of each security, $\Gamma$ contains order discounts, and $\tilde{X}$ contains real number values in the interval [0,1] depending on whether the order for each security is filled or partially filled. Let $\tilde{R}_{Filled}$ and $\tilde{R}_{Forced}$ be N×N diagonal matrices with individual expected asset returns corresponding to equations (2) and (3) along the diagonal and zeros elsewhere and $\tilde{R}_{Optional}$ be a N×N diagonal matrix with individual expected asset returns along the diagonal for the purchases and short sales and asset returns corresponding to equation (8) along the diagonal for the long sale scenario. N is an integer value of at least 1 and can be as large as computational power permits. Using superscript T for transpose, the equation for dollar gains becomes:

$$\tilde{G} = (\tilde{R}_{Filled}P)^T \tilde{X}(\Gamma) + \tilde{R}^\dagger P^T(i - \tilde{X}(\Gamma)) \quad (24)$$

where i is a column vector of ones and $\tilde{R}^\dagger$ is $\tilde{R}_{Forced}$ for the forced execution case and $\tilde{R}_{Optional}$ for the optional-execution case. For the purchase and short sale scenarios, the diagonal elements of $\tilde{R}_{Optional}$ are zero and equation (24) reduces to:

$$\tilde{G}_{Optional\_P/S} = (\tilde{R}_{Filled}P)^T \tilde{X}(\Gamma). \quad (25)$$

Thus, in another embodiment, the gains calculated in equation (24) and (25) can be substituted into equation (19) to calculate an optimal vector of order discounts, $\Gamma$. Considering the full set of transactions together adds some additional factors to the investor's decision. The investor can now account for the covariance between the returns on the entire portfolio being executed and the probabilities of executing all the trades.

An example may clarify this issue. Consider an investor attempting to purchase a slice of the S&P 500 index. The risk of non-execution may include the risk of not purchasing the winning securities in the index, as well as the risk of missing an entire industry sector should that sector experience a swing. The investor may choose to place at least some principal orders in securities from various sectors so as to reduce the risk of sector swings. (The method of the invention maximizes the expected utility of wealth to choose optimal order discounts. An index manager may wish to modify this objective function to minimize tracking error instead. This would be accomplished by minimizing the expected difference between returns to the investor's portfolio and the return to the benchmark being tracked.)

The method can be generalized further by allowing the investor to have an initial endowment of risky assets, each with a risky return associated with it. This embodiment more realistically captures the investor's decision, though it is more difficult to implement. We modify the gains equation (24) to include the risky dollar return of the portfolio.

$$\tilde{G} = (\tilde{R}_{Filled}P)^T \tilde{X}(\Gamma) + \tilde{R}^\dagger P^T(i - \tilde{X}(\Gamma)) + \tilde{R}_w^T W_{non-trade} \quad (26)$$

Thus, in a broader embodiment, the invention comprises a method of determining the discounts, $\Gamma$, from the principal price of each of N securities at which to place an order during a time period starting at time t and ending at time t+1, wherein the order is subject to uncertain execution for each security, so as to maximize the expected utility of wealth of an investor, the method comprising determining the value of $\Gamma$ for which EU(W) is a maximum from the equation:

$$\max_{\Gamma} EU(W) = EU\left\{ (\tilde{R}_{Filled}P)^T \tilde{X}(\Gamma) + (\tilde{R}^\dagger P)^T (i - \tilde{X}(\Gamma)) + (i + \tilde{R}_w)^T W_{non-trade} + i^T W_{trade} \right\} \quad (27)$$

wherein

EU(W) is the expected value of the utility function U;

N is the number of unique securities in the union of securities owned by the investor at time t and the securities for which orders are to be placed;

$\Gamma$ is a column vector whose elements are the order discount, $\gamma_j$, for each security;

P is a column vector of length N whose elements are $(p_{a,t})_j \cdot s_{j,t}$ when the order is a purchase and $(p_{b,t})_j$ when the order is a sale, wherein $(p_{a,t})_j$ and $(p_{b,t})_j$ are the principal prices of security j of the N securities at time t for purchase orders and for sale orders, respectively, adjusted for splits and dividends when the securities are equities, and $s_{j,t}$ are the number of shares of security j and the $s_{j,t}$ are independently a positive number or, when there is no order for security j, zero.

$\tilde{X}$ is a column vector of length N whose elements, $\tilde{x}_j$, are contained in the closed interval [0,1] and are the fraction of the order that is executed at discount $\gamma_j$;

$\tilde{R}^\dagger$ is $\tilde{R}_{Forced}$ if execution of the order is forced at the end of the time period or $\tilde{R}_{Optional}$ if execution of the order is optional at the end of the time period, t+1;

$\tilde{R}_{Filled}$, $\tilde{R}_{Forced}$, and $\tilde{R}_{Optinal}$ are N×N diagonal matrices whose non-diagonal elements are zero and whose diagonal elements are real, random variables, $(\tilde{r}_{Filled})_{j,j}$, $(\tilde{r}_{Forced})_{j,j}$, and $(\tilde{r}_{Optional})_{j,j}$, respectively, and are the expected returns of each of the N securities when the order is filled during the time period, forced to be executed by the end of the time period, and optionally executable by the end of the time period, respectively;

$\tilde{R}_w$ is a column vector of length N whose elements, $(\tilde{r}_w)_j$, are the returns at time t+1 on each of the j securities as given by $$(\tilde{r}_w)_j = \frac{(p_{m,t+1})_j - (p_{a,t})_j}{(p_{a,t})_j},$$

$W_{non-trade}$ is a column vector of length N whose elements, $(w_{non-trade})_j$, are the dollar values of each of the N securities already in the investor's possession, net of desired orders, and wherein the $(w_{non-trade})_j$ independently are a positive number, zero, or a negative number; and $W_{trade}$ is a column vector of length N whose elements, $(w_{trade})_j$, are the dollar values of each of the N securities already in the investor's possession which are to be traded and wherein the $(w_{trade})_j$ independently are a positive number, zero, or a negative number; and i is a column vector of length N whose elements are each 1, N is an integer value of at least 1 or more, j is an integer from 1 to N, and the superscript T indicates the transpose of a matrix.

More broadly still, in another embodiment, the invention comprises a method of determining the discounts, $\Gamma$, from the principal price of each of N securities at which to place an order during a time period starting at time t and ending at time t+1, wherein the order is subject to uncertain execution for each security, so as to maximize the expected utility of wealth of an investor, the method comprising determining the value of $\Gamma$ for which EU(W) is a maximum, wherein N is an integer value of 1 or more;

$\Gamma$ is a vector having elements $\gamma_j$, wherein $\gamma_j$ is the order discount for the $j^{th}$ security of the N securities for which an order is placed, EU(W) is the expected value of the utility function U;

W is the wealth of the investor at time t+1 given by the sum of:
  a) the dollar value on assets held in the portfolio, but not traded, at time t+1
  b) the dollar value, at time t, on assets held in the portfolio at time t, which are to be traded
  c) the dollar value realized when the order is filled at discount $\Gamma$ times the probability that the order for each of the securities will fill; and
  d) if the order did not fill before time t+1, the dollar value realized when (i) the order is forced at time t+1, or (ii) the order is optional at time t+1.

In the case that N is 1, equation (27) reduces to equation (14), wherein w is a scalar equal to the total dollar value of the securities already in the investor's possession;

$\tilde{r}^+$ is $\tilde{r}_{Forced}$ if execution of the order is forced at the end of the time period or $\tilde{r}_{Optional}$ if execution of the order is optional at the end of the time period, t+1;

$\tilde{r}_{Filled}$, $\tilde{r}_{Forced}$, and $\tilde{r}_{Optional}$ are $(\tilde{r}_{Filled})_{l,l}$, $(\tilde{r}_{Forced})_{l,l}$, and $(\tilde{r}_{Optional})_{l,l}$, respectively, and are the expected returns of each of the security when the order is filled during the time period, forced to be executed by the end of the time period, and optionally executable by the end of the time period, respectively;

$p_{a,t}$ is the principal price of the security, adjusted for splits and dividends;

s the number of shares of the security being traded; and $\tilde{x}(\gamma)$ is, the fraction of the order that is filled at discount $\gamma_1$.

Other preferred embodiments include the foregoing methods wherein the elements $(\tilde{r}_w)_j$ of $\tilde{R}_w$ are constant or zero, wherein the $\tilde{x}_j$ are independently 0 or 1, and/or wherein each of the $s_{j,t}$ are 1.

Where N>1, it may be the case that the trade list and portfolio list of assets already held are of different length and contain different assets. For example, the existing portfolio may contain 2500 shares of IBM and 5,000 shares of GE, and the trade list may include buy orders for 1,000 shares of IBM and 500 shares of RHAT. In this case, the value of N will be 3. In order to make the vectors and matrices the same lengths, it is necessary to include zeros for certain assets. The vector P should be of length 3 in this example. So, for GE, the value for s, the number of shares to be traded in GE, is set to zero. The value of s for RHAT in the vector P is 500, and the value of s for IBM is 1,000. The vector $W_{non-trade}$, is also of length N, and contains the dollar values of assets in the original portfolio which are not going to be traded. Using the same example, the value for w for RHAT is set to zero, and the values for GE and IBM are non-zero. The value for IBM is equal to 2,500 times the price at time t, and does not include the additional 1,000 shares to be purchased. The vector $W_{trade}$ is of length N, and contains dollar values for assets in the original portfolio which are going to be traded. In this case, IBM, GE, and RHAT all have zero values in $W_{trade}$. RHAT is zero because it doesn't exist in the current portfolio, GE is zero because no trades are being done in GE, and IBM is zero because the existing 2,500 shares are not being transacted. If the 1,000 shares of IBM were a sale instead of a purchase, then the value in $W_{trade}$ for IBM would be the price at time t multiplied by 1,000 shares, and the value for w in $W_{non-trade}$ would be 1500 shares multiplied by the price at time t (where 1500=2,500−1,000).

Using the same matrix formalism for the case of N>1, equations (19) and (16) are written as $$\max_{\Gamma} CE = E(\tilde{G}) - \frac{1}{2}\Psi(w)E(\tilde{G}^2) \qquad (28)$$

and $$\tilde{G} = (\tilde{R}_{Filled}P)^T \tilde{X}(\Gamma) + \tilde{R}P^T(i - \tilde{X}(\Gamma)) + \tilde{R}_w^T W_{non-trade} \qquad (29)$$

respectively. Conversely, in the case in which N is 1, equations (28) and (29) reduce to (19) and (16) with the same definitions of parameters as provided immediately above.

More broadly, the invention provides a method of determining the discount, $\Gamma$, from the principal price of each of N securities at which to place an order for one or more securities, wherein the order is subject to uncertain execution, for each security to maximize the expected utility of wealth of an investor, the method comprising determining the value of $\Gamma$ for which the certainty equivalent, CE($\tilde{G}$), is a maximum, wherein N is an integer value of 1 or more;

$\Gamma$ is a vector having elements $\gamma_j$, wherein $\gamma_j$ is the order discount for the $j^{th}$ security of the N securities for which an order is placed, $\tilde{G}$ is the gains of the investor given by the sum of:
  a) the change in the dollar value between time t and t+1 of all securities owned by the investor but not traded;
  b) the dollar value realized when the order is filled at discount $\Gamma$ times the probability that the order for each of the securities will fill; and
  c) if the order did not fill before time t+1, the dollar value realized when (i) the order is forced at time t+1, or (ii) the order is optional at time t+1.

In other preferred embodiments of the foregoing, the elements of $\tilde{R}_w$ are independently constant or zero, the risk aversion parameter is a constant, $\lambda$, the $\tilde{x}_j$ are independently 0 or 1, and/or each of the $s_{j,t}$ are 1.

All of the various embodiments of the method of the invention can be applied to purchases, sales, and short sales using the returns equations (1)–(4), (5)–(8), and (9)–(12), respectively.

In equations (28) and (29), the investor must consider not only the additional risks of the securities being executed and whether those orders fill, but also the covariance of those orders and securities with his existing portfolio. As an example, consider an equity manager with an existing portfolio trying to invest excess cash in a list of securities while trying to stay as diversified as possible. Given similar return expectations, he or she may prefer to place principal orders on securities which would offer the most diversification, perhaps names not already held, and place discounted orders subject to uncertain execution on companies already represented in the portfolio.

In general, to utilize the present invention, the following are prerequisites:

- user supplied prices for the securities to be analyzed, including
  - principal price at which the security can be traded with certainty; and
  - terminal valuation price equal to the fair market value of the security at the end of the trading horizon;
- user supplied probability density function for $x(\gamma)$, and any supporting data needed to evaluate this probability;
- user supplied distribution of expected returns to the security over the trade horizon (may be centered at zero, implying no information about future price direction is known);
- order size;
- user supplied choice of forced execution or optional execution; and
- bounds on feasible discount levels for an optimizer to consider.

Optional User Inputs to the invention which may add value but which are not required include the utility function and assumptions of risk aversion other than constant absolute risk aversion. In the case that the user is supplying a utility function, the invention may be used by optimizing equation (27) for $\gamma$ (possible discount levels). Where a specific utility function is not supplied, the invention may be used by optimizing equation (28) for $\gamma$ (possible discount levels).

While we have already discussed choices for user-input prices, bounds on feasible discount levels, forced and optional execution choices, order size, and risk aversion, we have not yet given examples for generating execution probabilities or return distributions, inputs which are also necessary for implementation. We now provide methods for estimating these parameters needed to numerically solve the maximization problems presented above. The following examples are provided for illustrative purposes only and are not intended, nor should they be construed, as limiting the invention in any manner. Those skilled in the art will appreciate that modifications and variations of the following examples can be made without exceeding the scope of the invention. Indeed, many quantitative financial shops have sophisticated and proprietary models for predicting parameters employed by the present invention, including return and volatility (For some examples, see Figlewski 1997). Users should certainly substitute their own proprietary parameter estimates for those provided below if desired. However, the following provide good examples of how to proceed in the case of equity limit order trading. They are also generalizable to the other modes of trading discussed in the introduction to the invention. Throughout, we indicate alternate methods of estimating inputs that the user may wish to consider. We calculate summary statistics of our data and provide background and intuition for trading with this methodology.

In order to optimize equation (19), the gains associated with trading, an embodiment likely to be used commercially, we need to take the expectation over the random variables involved. Equation (19) includes two random variables, asset return and the fill-rate variable, $\tilde{x}(\gamma)$. We begin by exploring the correlation between these random variables, demonstrating that any univariate distribution would provide misleading results. Then, using a probit model, we estimate the distribution of $\tilde{x}(\gamma)$ conditional on asset returns and other asset characteristics. In our example of limit order trading, we show that limit order discount, volatility, return, and percentage spread are significant in explaining the fill rates of limit orders. We also show that the components of return, specific return and systematic market return, are individually significant in explaining limit order fill rates. By separating out systematic market returns, the method of the invention is able to incorporate traditional portfolio risk factors in the limit order optimization solution.

Using publicly available stock data from the 1996 NYSE Trade and Quote (TAQ) data set and the 1991 NYSE Trade, Orders, and Quote (TORQ) data set, we first calculate asset returns conditional on limit order executions and unconditional limit order fill probabilities. For the months of July and August 1996, we randomly select 100 S&P500 stocks having the NYSE as a primary exchange. We define the trade period to be a 1-day period, as measured from the first quote on day t to the first quote on day t+1. (This choice of trade period is arbitrary, and can be modified by the user to suit personal needs.) Then, using the first offer (bid) quote on day t as our principal price for buys (sells), we test hypothetical buy (sell) limit orders at a discount (premium) varying from 0.5% to 3% of the principal price. (Again, as previously discussed, choice of principal price can be modified to suit the individual user). Discounts and premiums are rounded to the nearest eighth, unless rounding would cause a zero discount, in which case the discount is rounded to one-sixteenth. (All of our experiments were run with no rounding as well, but the results were not significantly different from those presented in the paper. When stock prices switch to decimal pricing, rounding to discrete ticks will no longer be necessary.)

In order to determine the successful execution of these hypothetical limit orders, we compare the limit price with the price stream reported by TAQ throughout the trade period. When the price history shows that the price crosses the limit price, we assume that the limit order fills. When the price history does not reach the limit price, we assume that the order does not fill. However, when the minimum (maximum) price exactly equals the purchase (sale) limit price, it is less clear whether we should assume the trade fills. We address this issue by examining the 1991 TORQ database containing actual limit order execution data. We examine those 7 securities in the TORQ which overlapped our random 100 stock sample. (One could also use actual limit orders from the TORQ data base for this analysis, but a number of possible biases would exist with such a procedure. First, while the TORQ provides thousands of limit orders, many of the observations are not independent. That is, only one buy limit order per stock per day is an independent observation. Second, limit orders are often canceled or changed; any feasible analysis would choose a sample of unchanged orders, and this sample may be biased.) For these 7 securities, we examined all of the 'good-until-canceled' and 'day-orders' placed from November 1991 through January 1992. The analysis is presented in Example 1, below. The results demonstrate that, on average, 70% of the limit orders placed were at least partially filled when the trade record showed a price exactly equal to, but not beyond, the limit order price within the trade period. This is consistent with Lo, MacKinlay, and Zhang (1997), who calculated similar statistics using an industry data set. Since we will use the simplification that order size is small (and therefore s is approximately equal to 1), we will also assume that a limit order fills if the price stream crosses the limit price, that it fills 70% of the time if the price stream 'touches' the limit price, and that the limit order does not fill if the price stream does not reach the limit price. This value of 70% is chosen here for illustrative purposes only, will vary between securities, and may depend on market conditions. Investors may wish to obtain a better estimate for their security. A user would do a similar analysis using a portfolio of interest to obtain an estimate specific to the securities most likely to be traded. Furthermore, if the user has access to data on actual limit order trades, it is preferable to incorporate this data into the statistical model for limit order fill rate rather than to rely wholly on hypothetically constructed limit orders. Both hypothetical limit orders and actual limit orders may be used for estimation purposes with good results.

Alternatively, one could establish upper and lower bounds for this analysis by using the most and least generous fill rate assumptions. That is, for a lower bound, one would assume that limit orders only fill if the price stream crosses the limit price. For an upper bound, one would assume that limit orders fill every time the price merely touches the limit price. We repeated the experiments in this paper using these bounds, and present our major results under these alternative assumptions in Example 2 and 3. As Examples 2 and 3 demonstrate, the optimal limit order choice is sensitive to these assumptions, and therefore it is worth the user's effort to accumulate a high quality dataset containing actual limit order trade history before estimating this parameter.

Table 1A presents average asset returns conditional on the execution of buy limit orders and Table 1B presents the results for sell orders. The method of the invention confirms previous findings by Handa and Schwartz (1996) that unfilled limit orders have positive opportunity costs. It also confirms that filled limit orders suffer from adverse selection costs. Intuitively, if an investor places a buy (sell) limit order at a significant discount (premium) to the market, it is more likely to be filled when the asset decreases (increases) in price than otherwise.

TABLE 1A

Limit Order Returns: Purchase Orders
Percentage of filled and unfilled limit orders and horizon security returns for 1-day buy limit orders given at discounts of γ. The sample is 100 S&P 500 stocks traded on the NYSE from July and August 1996.

| Order Type | γ | Percent Filled/Unfilled | 1-day avg. return | 2-day avg. return | 3-day avg. return |
|---|---|---|---|---|---|
| Filled orders | .5% | 85% | −0.6510 | −0.7189 | −0.7744 |
|  | 1% | 60% | −1.0920 | −1.1762 | −1.2794 |
|  | 2% | 28% | −1.9434 | −2.0266 | −2.0934 |
|  | 3% | 12% | −2.6859 | −2.7514 | −2.8967 |
| Unfilled Orders | .5% | 15% | 0.9821 | 0.9767 | 0.9886 |
|  | 1% | 40% | 0.6370 | 0.6023 | 0.6472 |
|  | 2% | 72% | 0.1826 | 0.1273 | 0.0967* |
|  | 3% | 88% | −0.0805 | −0.1364 | −0.1651 |

TABLE 1B

Limit Order Returns: Sell Orders
Percentage of filled and unfilled limit orders and horizon security returns for 1-day sell limit orders given at premiums of γ.

| Order Type | γ | Percent Filled/Unfilled | 1-day avg. return | 2-day avg. return | 3-day avg. return |
|---|---|---|---|---|---|
| Filled orders | .5% | 81% | 0.5774 | 0.5572 | 0.5456 |
|  | 1% | 55% | 1.0810 | 1.0924 | 1.0984 |
|  | 2% | 24% | 2.1060 | 2.0989 | 2.0794 |
|  | 3% | 10% | 3.2718 | 3.2448 | 3.0754 |
| Unfilled Orders | .5% | 19% | −1.0072 | −1.2510 | −1.4658 |
|  | 1% | 45% | −0.7115 | −0.8748 | −1.0040 |
|  | 2% | 76% | −0.2928 | −0.3755 | −0.4376 |
|  | 3% | 90% | −0.0447* | −0.1081 | −0.1458 |

Tables 1A and 1B also provide empirical estimates of fill rates conditional on γ. For example, for 1-day limit orders with γ equal to 1%, the estimated probability of a limit order filling is approximately 60%. However, this number is not conditional on asset returns or other stock characteristics. For a given level of expected return, the probability of a 1-day, 1% limit order filling may be substantially higher or lower. It is therefore necessary to do a more careful estimation of fill-rate probabilities, where the estimates are conditional on asset returns.

We next examine the correlations between whether an order filled and the securities' returns. As expected, we find filled buy orders are significantly negatively correlated with returns and filled sell orders are significantly positively correlated with returns, with correlation coefficients ranging from −0.3 to −0.6 for buys and 0.3 to 0.5 for sells. These correlations are significant at the 1% level in all cases and hold for buy orders placed at small or large discounts and sell orders placed at small or large premiums. Not surprisingly, return and fill probability are jointly determined, and we must therefore use the joint density between stock returns and limit order fill rates when maximizing the gains equations (16) and (16)(a).

We next construct a probit model to estimate the probability of a buy limit order filling conditional on returns and other factors. We will use this probit model to generate the required estimates for fill-rate. The probit will be conditional on asset returns, as well as other variables. A user may either assume the fill rate variable is bivariate, taking on the value 0 or 1, or they may assume that it is continuous, and is contained in the closed interval [0,1]. For our example, we use a binary approach. This is a reasonable simplification to make if order sizes tend to be small, as the likelihood of a full fill is nearly the same as the likelihood of a partial fill. Our binary dependent variable is constructed using the same technique used to construct Table 1A for purchase limit orders. As above, for each stock for each of the 40 days in our study, we simulate 1-day limit orders for γ's at discounts of 0.5%, 1%, 2%, and 3%. If we were to use this entire data set, however, our standard errors would be understated due to the correlation between our dependent variables. Therefore, we randomly select one observation for each stock for each day to minimize this effect. Using these variables, we run an explanatory probit regression, where the dependent variable is equal to 1 when a limit order fills and 0 otherwise. (We also tried deleting observations where returns could be considered a perfect classifier. That is, if returns are smaller than the limit order discount, the probability of fill is 100%. Deleting perfect classifiers had little effect on the estimated coefficients.) The independent variables include the limit order discount, returns, percentage bid-ask spread, and non-linear terms in several of these variables. Other types of variables that the user may wish to include in the probit model are trade time horizon, so that expected fill rate is a function of the length of time the limit order will be outstanding, size of order, so that expected fill rate is a function of order size, and volatility, to a name a few. Table 2 provides a summary of variable definitions, and Table 3 provides averages and standard deviations for the independent variables.

TABLE 2

Variable Definitions
Definitions of explanatory variables for probit regressions using a 1-day trading horizon.

$GAM_{n,t,y} = gamma_{n,t,y}/p_{n,a,t}$      where $GAM_{n,t,y} \in \{.005, .01, .02, .03\}$
$GAM2_{n,t,y} = GAM_{n,t,y}^2$      $GAM3_{n,t,y} = GAM_{n,t,y}^3$ $RET_{n,t} = 100 * \dfrac{p_{n,m,t+1} - p_{n,a,t}}{p_{n,a,t}}$      $RET2_{n,t} = RET_{n,t}^2$ $RET3_{n,t} = RET_{n,t}^3$ $MKT_{n,t} = \hat{b}_i * \dfrac{SP500\,open_{t+1} - SP500\,open_t}{SP500\,open_t}$ $SPEC_{n,t} = RET_{n,t} - \hat{b} * \dfrac{SP500\,open_{t+1} - SP500\,open_t}{SP500\,open_t}$      $SPEC2_{n,t} = SPEC_{n,t}^2$

•$SPEC3_{n,t} = SPEC_{n,t}^3$

•$PERSPR_{n,t} = \dfrac{average(Offer_{n,t} - Bid_{n,t})}{p_{n,a,t}}$

TABLE 3

Means and Standard Deviations
Mean, standard deviation, and count of the variables examined for correlation with limit order execution probabilities in the probit below. Variables are defined in Table 2 above. The number of observations is equal to 4300 for all variables

| Variable | Mean | Standard Deviation |
| --- | --- | --- |
| GAM | .0165 | .0097 |
| RET | −0.4052 | 1.8269 |
| SPEC | −0.3978 | 1.9610 |
| MKT | −0.0074 | .7474 |
| PERSPRD | .0055 | .0031 |
| S&P Returns | .0000 | .0091 |
| Beta | .8028 | .2784 |

The probit regressions are contained in Table 4. Regression 1 is given by the following equation:

$$FILL_{n,t} = \Phi\begin{pmatrix} a + b_1 GAM_{n,t} + b_2 GAM2_{n,y} + b_3 GAM3_{n,t} + \\ b_4 RET_{n,t} + b_5 RET2_{n,t} + b_6 RET3_{n,t} + b_7 PERSPRD_{n,t} + e_{n,t} \end{pmatrix} \quad (30)$$

$$\text{where } FILL_{n,t} = \begin{cases} 0 & \text{if limit order unfilled} \\ 1 & \text{if limit order filled} \end{cases} \quad (31)$$

and $\Phi$ is the cumulative normal density. Notice that $FILL_{n,t}$ is equivalent to $\tilde{x}(\gamma)$ in section II.

As expected, we find the coefficients on GAM to be significant and negative, as larger discounts imply a smaller probability of fill. This relationship is, however, highly non-linear, as both GAM2 and GAM3 are significant. The percentage bid-ask spread is positive and significant, possibly because higher spreads are associated with higher volatility (Copeland and Galai, 1983). The coefficient on returns, RET, is negative, as high returns imply a lower probability of filling. The coefficient on squared returns, RET2, is positive and may be considered a proxy for volatility. We tested additional measures of volatility terms but omitted them due to collinearity with squared returns.

Alternatively, the sophisticated user may wish to estimate the continuous fill rate variable. The suggested approach for this is to estimate an ordered probity rather than a bivariate probit. Using this approach, the dependent variable would be segregated into ordered "bins", and the probability of ending up in one of the bins is estimated. For example, the dependent variable may now take on 10 values, ranging from 1 to 10, where a 1 corresponds to 0% filled, 2 corresponds to a fill rate>0% but less than 10%, 3 corresponds to a fill rate>=10% but less than 20%, etc . . . up to bin 10 which corresponds to a fill rate of 100%. The ordered probit may then be estimated using a generalized maximum likelihood estimation technique. (For an example of an ordered probit equation estimated with financial data see, See Hausman, Lo, and MacKinlay, 1992).

Many statistical software packages offer pre-written procedures to enable the user to easily estimate probit models. For example, SAS has a procedure "PROC PROBIT" which only requires that the user specify the dependent variable and a list of independent variables. Other packages such as Gauss and MatLab also provide powerful statistical tools to facilitate this type of analysis.

Returning to our bivariate example, when examining returns as an independent variable, it makes sense to determine if limit order fill rates are functions of stock specific moves or of market-wide moves. If market-wide moves influence fill rates, the extensions to our theoretical model become important because limit orders become a function of systematic as well as stock specific risk. We therefore include Regression 2 in Table 4 which includes systematic as well as stock specific risks. We define MKT as the systematic component of returns equal to the stock's beta multiplied by the market return, and we define SPEC as the stock's specific return, measuring the idiosyncratic component. We calculate Beta using a one year sample of daily returns from the 1995 CRSP tapes. Regression 2 is given by:

$$FILL_{n,t} = \Phi \begin{pmatrix} a + b_1 GAM_{n,t} + b_2 GAM2_{n,t} + b_3 GAM3_{n,t} + \\ b_4 SPEC_{n,t} + b_5 SPEC2_{n,t} + b_6 SPEC3_{n,t} + \\ b_7 MKT_{n,t} + b_8 PERSPRD_{n,t} + e_{n,t} \end{pmatrix} \quad (32)$$

TABLE 4

Probit Regressions
Probit Regression on whether a 1-day buy limit order fills. Standard errors are given in parentheses. All coefficients are significant at the 1% level. Variables are defined in Table 2 above.

| Variable | Regression 1 | Regression 2 |
|---|---|---|
| INTERCEPT | 1.9180 | 2.0712 |
|  | (0.2112) | (0.2168) |
| PERSPRD | 134.86 | 137.58 |
|  | (10.04) | (10.23) |
| GAM | −374.33 | −410.01 |
|  | (47.07) | (48.28) |
| GAM2 | 12,853.47 | 14,585.77 |
|  | (2,974.76) | (3,046.32) |
| GAM3 | −201,099.34 | −22,8503.78 |
|  | (55,486.89) | (56,845.87) |
| RET | −0.6664 | — |
|  | (0.0249) |  |
| RET2 | 0.1209 | — |
|  | (0.0086) |  |
| RET3 | −0.0051 | — |
|  | (0.0005) |  |
| SPEC | — | −0.6897 |
|  |  | (0.0257) |
| SPEC2 | — | 0.1007 |
|  |  | (0.0071) |
| SPEC3 | — | −0.0037 |
|  |  | (0.0004) |
| MKT | — | −0.9669 |
|  |  | (0.0473) |
| Log Likelihood | −1,351.56 | −1,316.95 |
| Number of Observations | 4300 | 4300 |

Interestingly, both MKT and SPEC show significant negative coefficients for buy orders (this remains true in the absence of the higher order terms). These significant coefficients indicate that the probability of a limit order filling is partially explained by systematic market factors and partially explained by stock specific factors. This result underscores the necessity of accounting for systematic risks when simultaneously placing limit orders on multiple stocks.

We tested this hypothesis formally using a log-likelihood test on probit regressions with RET or with both SPEC and MKT. By definition, RET=MKT+SPEC, and our null hypothesis is a test of whether the coefficients on MKT and SPEC are equal, and thus whether using market returns separately does not add to the estimate. We are able to reject the null hypothesis at the 1% level.

Regressions run for sell limit orders give symmetric results; the same variables are significant and the signs are reversed on the coefficients for the RET, RET2, RET3 SPEC, SPEC2, SPEC3 and MKT variables.

While the empirical models presented here are simple, they yield good optimization results as presented in our next section. In practice, more complicated predictors of volatility, or return could be substituted (See, for instance, Figlewski, 1997) for the independent variables we suggest. Additionally, return could be further segregated into more detailed industry classifications. A common way to segregate returns into industry classifications and other categories is offered by BARRA, a Berkeley based company. The user should expect to re-estimate this model periodically, and probably at least monthly.

In the case of POSIT® trading, the fill-rate parameter being estimated, $\tilde{x}(\gamma)$ would be the probability of an order filling in a POSIT® system match. Again, it could be bivariate or continuous, and may be a function of different independent variables, for example, percentage fill rate on previous attempts in POSIT®, activity level in the stock during the time preceding the POSIT® match, etc. The principal prices used in the returns equations would likely be principal order prices solicited from brokers, and the invention could then be employed in a similar manner as presented in the equity limit order example.

Now that we have presented a methodology for calculating execution probabilities $\tilde{x}(\gamma)$, we demonstrate how to use this input to generate optimal discounts. In a preferred embodiment of the invention, we replace the expectation in the certainty equivalent, equation (19) and (22), with an integral over the joint distribution of the random variables $\tilde{r}$ and $\tilde{x}(\gamma)$. Thus, the investor's problem in equation (19) is written as $$\max_{\gamma} CE = \qquad (33)$$

$$\int_0^1 \int_{-\infty}^{\infty} \tilde{g}(\tilde{r},\tilde{x}) f(\tilde{r},\tilde{x}) d\tilde{r} d\tilde{x} - \frac{1}{2}\Psi(w) \int_0^1 \int_{-\infty}^{\infty} \tilde{g}^2(\tilde{r},\tilde{x}) f(\tilde{r},\tilde{x}) d\tilde{r} d\tilde{x}$$

where $\tilde{g}(\tilde{r},\tilde{x})$ is our definition of gains, and $f(\tilde{r},\tilde{x})$ is the joint distribution of the random variables for returns and fill, $\tilde{r}$ and $\tilde{x}(\gamma)$. In a more preferred embodiment, the risk aversion is estimated to be a constant, as in equation (20). We write the joint distribution in (33), $f(\tilde{r},\tilde{x})$, as a univariate distribution of $\tilde{r}$ times the conditional probability of $\tilde{x}(\gamma)$. In one embodiment of the invention, $\tilde{x}(\gamma)$ only takes on two discrete outcomes (i.e., the order is completely filled or not filled), integrating over $d\tilde{x}$ is equivalent to summing over the two states, 0 or 1. Let $P(\tilde{x}=1|\gamma,\tilde{r})$ be the probability that $\tilde{x}(\gamma)$ is 1 given $\tilde{r}$ and $\gamma$. Equation (33) can then be written as:

$$\max_{\gamma} CE = \int_{-\infty}^{\infty} \tilde{g}(\tilde{r},0) f(\tilde{r}) P(\tilde{x}=0 | \gamma, \tilde{r}) d\tilde{r} + \qquad (34)$$

$$\int_{-\infty}^{\infty} \tilde{g}(\tilde{r},1) f(\tilde{r}) P(\tilde{x}=1 | \gamma, \tilde{r}) d\tilde{r} -$$

$$\frac{1}{2}\Psi(w) \left[ \int_{-\infty}^{\infty} \tilde{g}^2(\tilde{r},0) f(\tilde{r}) P(\tilde{x}=0 | \gamma, \tilde{r}) d\tilde{r} + \int_{-\infty}^{\infty} \tilde{g}^2(\tilde{r},1) f(\tilde{r}) P(\tilde{x}=1 | \gamma, \tilde{r}) d\tilde{r} \right]$$

wherein $F(\tilde{r},\tilde{x})=f(\tilde{r})P(\tilde{x}=a|\gamma,\tilde{r})$ and a is 0 or 1.

Alternatively, the sophisticated user may use a continuous value for the variable $\tilde{x}(\gamma)$. In this case, instead of summing over zero and one as above, one would sum over all the different values times their probabilities. For instance, one could allow $\tilde{x}(\gamma)$ to take on values inside different bins, that is, $\tilde{x}(\gamma)$ could be categorized into one of the sets {0, (0,0.25], (0.25,0.5], (0.5,0.75], (0.75,1), 1}. Then, instead of summing over the two values and probabilities of $\tilde{x}(\gamma)$ as above, one would sum over these six possibilities. The probability of $\tilde{x}(\gamma)$ taking on values in any of these bins would be calculated with an ordered probit regression, instead of a regular probit if $\tilde{x}(\gamma)$ takes on only the values 0 or 1. In this case, equation (33) becomes:

$$\max_{\gamma} CE = \sum_{m=1}^{k} \left( \begin{array}{c} \int_{-\infty}^{\infty} \tilde{g}(\tilde{r}, \beta_m) f(\tilde{r}) P(\tilde{x} \in B_m \mid \gamma, \tilde{r}) d\tilde{r} - \\ \frac{1}{2} \lambda \int_{-\infty}^{\infty} \tilde{g}^2(\tilde{r}, \beta_m) f(\tilde{r}) P(\tilde{x} \in B_m \mid \gamma, \tilde{r}) d\tilde{r} \end{array} \right) \quad (35)$$

wherein $F(\tilde{r},\tilde{x}) = f(\tilde{r}) P(\tilde{x} \in B_m \mid \gamma, \tilde{r})$;

$f(\tilde{r})$ is a univariate distribution of $\tilde{r}$;

$\tilde{x}(\gamma)$ is continuous in the closed interval [0,1]

$P(\tilde{x} \in B_m \mid \gamma, \tilde{r})$ is the probability that $\tilde{x}(\gamma) \in B_m$ for a given $\tilde{r}$ and $\gamma$;

k is an integer equal to or greater than 2;

$B_m$ is the fill rate range, wherein m is an integer of from 1 to k and the group of $B_m$ from m=1 to m=k includes the entire interval [0,1] and each fill rate is contained within only one range; and $\beta_m$ is a fill rate representative of the range in $B_m$ in which $\beta_m$ is contained.

As can be seen, in equation (35) Ψ(w) has been set to a constant, γ.

For Example $B_1 = [0, 0.10)$ representing the range of fill rates including 0% and ranging up to but not including 10%, $\beta_1 = 0.05$ $B_2 = [0.10, 0.20)$ representing the range of fill rates including 10% and ranging up to but not including 20%, $\beta_{21} = 0.15$

. . .

$B_k = [0.90, 1.00]$ representing the range of fill rates including 90% and above, $\beta_k = 0.95$.

Generally, the fill rate ranges for any particular use can be of the same or different size, and k can be as large as computing power and data integrity allow.

Alternatively, one could have three categories for $\tilde{x}(\gamma)$; either {0, partial, 1} where partial would be any partial fill. A second distribution could then be estimated for what happens if there is a partial fill, For instance, one could sample the partial fills and then use them to estimate the probability density function (pdf) for what percentage fills in the case of a partial. Any pdf would be acceptable although it would have to take on values in the range (0,1), and as a pdf it would have to integrate to 1. For instance, one could estimate this pdf as part of a normal distribution, and because it is limited in the (0,1) range, rescale it so that it integrates to 1. Other methods for estimating this distribution, such as logit, uniform or nonparametric estimation techniques, are also possible.

Equation (34) can be solved numerically using standard methods. In a preferred embodiment, $f(\tilde{r})$ is assumed to be a guassian distribution (although other distributions can also be employed, such as non-parametrically estimated distributions) and the optimal discount, γ, is determined from equation (34) using a numerical Newton-Raphson optimization routine. One should check that an outright buy is not preferred, as this function may be discontinuous when γ=0. (Note that because the expected gains function is not necessarily single-peaked, we actually combine a line search and Newton-Raphson algorithm. Alternatively, one could use a discrete optimization over the possible tick sizes. For our analysis, we present a continuous maximization.)

Intuition suggests that the level of discount γ varies inversely with the expected value of $\tilde{r}$, the expected return of the security (see Chakravarty and Holden (1994) for a similar result). This intuition is consistent with the notion that the more information is motivating the trade, the larger are the expected returns for the security, and the more costly non-execution becomes. Therefore, if an investor expects large returns, discounted uncertain orders may not be appropriate.

We solve for optimal levels of limit order discounts in a variety of scenarios by solving the investor's problem of a single stock purchase as stated in equation (34). Investors choose the optimal discount, γ, for a purchase given varying risk preferences, λ, and varying expected returns to the risky asset.

We used actual market data when solving equation (34) in order to demonstrate the applied value of the method of the invention. We used the probit equation estimated in Regression 1 of Table 4 to give the conditional distribution of $P(\tilde{x}=1 \mid \gamma, \tilde{r})$, if returns are greater than −γ. If returns are less than −γ, we know the order fills and therefore $P(\tilde{x}=1 \mid \gamma, \tilde{r})$ is set equal to one.

For the following sample optimizations, we create an "average stock". That is, we take the statistical average of the percentage spread and volatility of all the stocks in our sample and create a fictitious asset, call it asset XYZ. The user would repeat these optimizations for each asset of interest, substituting in unique values for each asset.

In Table 5 we solve for optimal limit order discounts given expected return, standard deviation of return, and varying levels of risk aversion. We assume that returns on the risky asset XYZ, $\tilde{r}$, are normally distributed with daily standard deviation of 1.6%, which is approximately equal to the actual standard deviation of returns in our sample. (Because actual returns have fatter tails than that given by a normal distribution, a simple estimate of variance based on the untrimmed returns provided a disappointing fit. The variance of the untrimmed distribution was 1.8%. Alternatively, distributions other than the normal could easily be used. The model is sufficiently general that a variety of predictive techniques may be substituted for the simple ones presented here.) In order to demonstrate a variety of optimal limit orders, we vary the expected daily return on the risky asset, $\tilde{r}$, from −0.8% to 1.2%. These levels correspond to various private beliefs of the investors about the returns of the security. The uninformed investor will have an expected return equal to −0.275%, equal to minus half the bid-ask spread, as buy returns are evaluated from the offer at time t to the midpoint at time t+1. We vary the coefficient of risk aversion from the risk neutral case, λ=0, to a more risk averse λ=0.25. We cap the range of possible limit order discounts at 3% because our conditional density function is estimated over this range.

TABLE 5

Optimal Limit Order Discounts as a Percentage of Principal Price
for Various Levels of Risk Aversion
Optimal limit order discount, γ, calculated by maximizing equation (24)
using the empirically estimated distribution for fill rates given in
regression 1 of Table 4. Optimizations are over varying investor beliefs
about expected stock returns, and risk parameters λ. Forced limit order
strategies assume that the security is purchased at the end of the trading
horizon if the limit order does not fill. Optional limit orders assume that
the investor does not purchase the security if limit order does not fill. The
standard deviation, σ, of returns matches the sample at 1.6. An
uninformed investor would expect returns equal to half the bid-ask spread,
or -0.275%.

| Expected Daily Stock Return | Forced Limit Order Strategy Single Stock Purchase | | | Optional Limit Order Strategy Single Stock Purchase | | |
|---|---|---|---|---|---|---|
| | λ = 0 σ = 1.6 | λ = 0.10 σ = 1.6 | λ = 0.25 σ = 1.6 | λ = 0 σ = 1.6 | λ = 0.10 σ = 1.6 | λ = 0.25 σ = 1.6 |
| -0.8% | 2.69% | 2.76% | 2.87% | 2.97% | 3.00% | 3.00% |
| -0.4% | 0.64% | 2.43% | 2.56% | 2.67% | 2.76% | 2.90% |
| -0.275% | 0.53% | 0.63% | 2.44% | 2.55% | 2.65% | 2.80% |
| 0.0% | 0.39% | 0.43% | 0.53% | 0.48% | 0.56% | 2.56% |
| 0.4% | 0.26% | 0.29% | 0.33% | 0.31% | 0.35% | 0.42% |
| 0.8% | 0.18% | 0.19% | 0.21% | 0.21% | 0.23% | 0.26% |
| ≧1.2% | 0.0% | 0.0% | 0.0% | 0.00% | 0.00% | 0.00% |

Table 5 presents a variety of optimal limit orders corresponding to different return expectations and levels of risk. Columns 2 through 4 consider the forced-execution purchase strategy, where the investor buys the security if the limit order does not fill at the end of the trading horizon. This corresponds to determining the gains from equation (16). Columns 5 through 7 of Table 5 present the results from using the optional-execution limit order strategy where the investor does not purchase the security if the order does not fill. This corresponds to calculating gains from equation (16)(a).

The method demonstrates that in the forced-purchase case, investors will often prefer limit orders to market orders in the absence of future price information (expected returns=-0.275). Interestingly, even in the presence of some positive information, limit orders may be optimal. With expected returns of 0%, the optimal discount for the nsk neutral investor is 0.17%. As expected returns become more positive, market orders are preferable to limit orders; the opportunity cost of not getting filled begins to outweigh the savings offered by the limit order discount. The effect of risk aversion is evident as expected returns increase. With positive information, a rising level of risk aversion implies smaller or no discounts. For sufficiently negative expected returns. the investor would prefer to wait until the end of the period before buying. This result corresponds to the -0.8% expected return scenario, where an investor would prefer to use the 3% discount limit order, and therefore effectively wait until the end of the trading period before buying.

The optional-execution limit order strategy, using equation (16)(a), gives somewhat similar results in columns 5–7 of Table 5. Again, investors often prefer to use limit orders rather than market orders. For instance, with 0% expected returns, the investor would prefer to place an order 0.48% below the offer price. With an average bid-ask spread of 0.55%, this corresponds to placing an order just above the bid side of the market. As expectations continue to increase, investors again prefer market to limit orders, and for expected returns of 1.2% or greater, market orders are preferred to limit orders for all levels of risk aversion tested. As risk aversion increases, the optimal limit order discount decreases. Investors prefer larger discounts if they are more risk averse because larger discounts imply a higher likelihood of holding cash, and the overall variance of expected gains actually decreases with a higher discount.

In contrast to the forced-execution results, optimal limit order discounts are relatively large for the optional-execution case in the absence of information (expected returns=-0.275). The optional-execution results show that it is optimal to place discounts as large as 2.8%, depending upon risk aversion. We show that these larger discounts actually generate a positive trading strategy.

Whereas Table 5 provides optimal limit orders by level of risk aversion, Table 6 provides optimal limit orders by expected return volatility for a risk neutral investor Higher volatility has two impacts: first, it increases the probability of fill as given by regression 1 of Table 4, and second, it increases the adverse selection cost of filled orders and the opportunity cost of unfilled orders. The result is that as volatility increases, limit orders become less desirable. If we consider that placing a limit order is analogous to writing an option to the market (or dealer), then we would expect that option to have higher value as volatility increases. As volatility decreases, limit orders look relatively more attractive. As the last column of Table 6 shows, if expected returns are negative and volatility is high, investors prefer not to invest. and refrain from placing any type of order in the stock.

TABLE 6

Optimal Limit Order Discounts as a Percentage of Principal Price for
Various Security Variances
Optimal limit order discount, γ, calculated by maximizing equation (24)
using the empirically estimated distribution for fill rates given in
regression 1 of Table 4. Optimizations are over varying investor beliefs
about expected stock returns, and standard deviations for a risk-neutral
(λ = 0) investor. Forced limit order strategies assume that the security
is purchased at the end of the trading horizon if the limit order does not
fill. Optional limit orders assume that the investor does not purchase the
security if limit order does not fill. An uninformed investor would
expect returns equal to half the bid-ask spread, or -0.275%.

| Expected Daily Stock Return | Forced Limit Order Strategy Single Stock Purchase | | | Optional Limit Order Strategy Single Stock Purchase | | |
|---|---|---|---|---|---|---|
| | λ = 0 σ = 0.6 | λ = 0 σ = 1.6 | λ = 0 σ = 2.6 | λ = 0 σ = 0.6 | λ = 0 σ = 1.6 | λ = 0 σ = 2.6 |
| -0.8% | 1.61% | 2.69% | 3.00% | 1.90% | 2.97% | * |
| -0.4% | 1.02% | 0.64% | 0.29% | 1.30% | 2.67% | * |
| -0.275% | 0.89% | 0.53% | 0.26% | 1.12% | 2.55% | * |
| 0.0% | 0.66% | 0.39% | 0.21% | 0.81% | 0.48% | 0.25% |
| 0.4% | 0.44% | 0.26% | 0.0% | 0.52% | 0.31% | 0.19% |
| 0.8% | 0.29% | 0.18% | 0.0% | 0.34% | 0.21% | 0.0% |
| 1.2% | 0.18% | 0.0% | 0.0% | 0.22% | 0.0% | 0.0% |
| ≧1.6 | 0.0% | 0.0% | 0.0% | 0.0% | 0.0% | 0.0% |

*Cash is preferred to the limit order in these scenarios.

Tables 5 and 6 produce a pattern of optimal strategies. However, these results are generated using average stock characteristics, and it is possible to derive a more specific set of strategies for any security given the methodology outlined above. For each stock being analyzed, unique values of expected stock return and expected return volatility, as well as unique estimates for expected fill rate, would be used to generate optimal limit order strategy, We next return to the empirical evidence to check that, in the risk neutral case, the results of the optimization provide the highest returns for our data.

Table 7 provides empirical returns to hypothetical buy limit orders placed at discounts of 0.5%, 1.0%, 2.0%, and 3.0% below the starting offer prices for our sample of 100 stocks. All returns are generated in the same manner as described in section III. The sample, in aggregate, had slightly negative returns in the months considered; the average security return from offer to next-day's midpoint in our sample was −0.4052%, slightly more negative than half the bid-ask spread. The second column of Table 7 presents the forced-execution limit order returns where, corresponding to equation (5), the stock is purchased at the next day's first offer price if the limit order does not fill. The fifth column of Table 7 presents the optional-execution limit order returns where, corresponding to equation (16)(a), the stock is not purchased if the limit order does not fill. The majority of the average returns presented are statistically different from zero using a standard t-test with a 95% confidence level. The few strategies that are not significant from zero are the returns to the optional limit order strategy at $\gamma$ equal to 0.5% and 1%. As shown, the optional-execution strategy yields returns which are statistically different from the market-order strategy at all levels of $\gamma$, and the forced-execution strategy is statistically different from the market order strategy at $\gamma=0.5\%$ and $\gamma=2\%$.

The foregoing demonstrates that the invention provides a solution to the investor's decision of whether to place a limit order, and at what price, given individual beliefs and stock characteristics. Using a probit analysis on NYSE trade and quote data, we show how limit order discount, security returns, bid-ask spread, and intraday volatility are correlated with whether a limit order fills. We then use this estimated distribution to demonstrate how a risk neutral or risk averse investor with varying levels of information would choose a limit order.

We considered two cases in detail. In the forced-execution case, investors purchase the security at the end of the trading horizon if the limit order does not fill. In the optional-execution case, investors only purchase at the limit order price. For both cases, limit orders frequently offer superior returns to market orders for the average stock in our sample, and in some circumstances, can actually provide excess returns. Because of the high probability of filling, uninformed investors prefer to place buy orders within the

TABLE 7

Optimal Limit Order Discounts as a Percentage of Principal Price for Various Principal-Ask Spreads
Optimal limit order discount, $\gamma$, calculated by maximizing equation (24) using the empirically estimated distribution for fill rates given in regression 1 of Table 4. Optimizations are over varying investor beliefs about expected stock returns, and standard deviations for a risk-neutral ($\lambda = 0$) investor. Forced limit order strategies assume that the security is purchased at the end of the trading horizon if the limit order does not fill. Optional limit orders assume that the investor does not purchase the security if limit order does not fill. An uninformed investor would expect returns equal to half the bid-ask spread, or −0.275%. The standard deviation of returns is kept at the average 1.6% in all cases.

| Expected Daily Stock Return | Forced Limit Order Strategy Single Stock Purchase | | | Optional Limit Order Strategy Single Stock Purchase | | |
|---|---|---|---|---|---|---|
| | % spread = 0.275 | % spread = 0.55 | % spread = 1.10 | % spread = 0.275 | % spread = 0.55 | % spread = 1.10 |
| −0.8% | 3.00% | 2.69% | 2.15% | * | 2.97% | 2.59% |
| −0.4% | 2.82% | 0.64% | 0.92% | 3.00% | 2.67% | 2.18% |
| −0.275% | 2.72% | 0.53% | 0.81% | 2.92% | 2.67% | 1.90% |
| 0.0% | 0.29% | 0.39% | 0.66% | 0.33% | 0.48% | 0.86% |
| 0.4% | 0.0% | 0.26% | 0.52% | 0.0% | 0.31% | 0.62% |
| 0.8% | 0.0% | 0.18% | 0.42% | 0.0% | 0.21% | 0.49% |
| 1.2% | 0.0% | 0.0% | 0.35% | 0.0% | 0.0% | 0.40% |
| 1.6% | 0.0% | 0.0% | 0.30% | 0.0% | 0.0% | 0.34% |

*Cash is preferred to the limit order in these scenarios.

The highest average return in the forced-execution case is −0.344%, where the investor places limit orders at discounts of 0.5%. This provides some confirmation of the optimal discount of 0.28% given in Table 5 for an investor who anticipates a returns of −0.4%. Optional-execution strategies provide positive returns in a number of scenarios, and provide the highest returns at a 3% discount. This provides some confirmation for the optimal 2.67% discount suggested by our model for the risk neutral investor in Table 5.

We also checked the expected gains generated by equation (34) against the empirical returns in Table 7. Equation (34) provided returns within 0.05% of actual returns for each scenario, given the underlying expected returns of −0.4052%. We were therefore able to check the consistency of our model against the actual data. While improvements could be made by finding a more complex relation between returns and fill rates, as given by a semi-parametric estimator for instance, or by using a non-normal distribution of returns, we believe this model provides a thorough example of how an investor could choose an optimal limit order, bid-ask spread in the forced-execution case, and below the bid side in the optional-execution case. The foregoing demonstrates the sensitivity of the method to the investor's risk aversion, their expected return on the security, and the volatility of the security's returns.

The following examples are provided for illustrative purposes only and are not intended, nor should they be construed, as limiting the invention in any manner. Those skilled in the art will appreciate that modifications and variations of the preceding analysis can be made without exceeding the scope of the invention.

EXAMPLES

Example 1

TORQ Analysis

Estimated probability of whether an order fills if a trade occurs at, but not through, the order price. These results are drawn from the TORQ data set. Only day-orders or goodtill-canceled orders are included, and fill-or-kill orders are excluded. Orders that were canceled are not included because the TORQ data does not contain cancellation times. Additionally, we excluded orders with certain condition codes such as "all or nothing" stipulations.

For good-till-canceled orders, we followed the tick-by-tick price stream for 24 hours following the order placement time to determine if a trade occurred at or beyond the limit price. For day orders, we followed the tick-by-tick price stream through the closing price to determine if a trade occurred at or beyond the limit price.

TABLE E1

| TKR SYMBOL | Complete Fill % | Partial Fill % | No Fill % | Orders Analyzed |
|---|---|---|---|---|
| AR | 35.42% | 43.75% | 20.83% | 215 |
| DCN | 20.83% | 33.33% | 45.83% | 302 |
| FDX | 59.35% | 13.01% | 27.64% | 1337 |
| MDP | 26.42% | 37.74% | 35.85% | 271 |
| PH | 37.14% | 34.29% | 28.57% | 428 |
| SNT | 55.88% | 20.59% | 23.53% | 805 |
| WIN | 45.61% | 19.30% | 35.09% | 417 |
| Average | 44.51% | 25.75% | 29.74% | 3775 |

Example 2

Upper Bound Analysis

The analysis in Example 1 was repeated using the most generous fill-rate assumption. That is, if the price stream shows that the price for the day touched but did not cross the limit order price, we assume that the limit order fills. So we assumed an order fills 100% at a cross, 100% at a touch, and 0% with no touch.

TABLE E2A

Limit Order Returns: Purchase Orders
Percentage of filled and unfilled limit orders and horizon security returns for 1-day buy limit orders given at discounts of $\gamma$. The sample is 100 S&P 500 stocks traded on the NYSE from July and August 1996.

| Order Length | $\gamma$ | Percent Filled/Unfilled | 1-day avg. return | 2-day avg. return | 3-day avg. return |
|---|---|---|---|---|---|
| Filled orders | 0.5% | 89% | −0.5881 | −0.6555 | −0.7084 |
| | 1% | 65% | −1.0005 | −1.0768 | −1.1697 |
| | 2% | 30% | −1.8719 | −1.9481 | −2.0334 |
| | 3% | 14% | −2.6017 | −2.7011 | −2.8823 |
| Unfilled Orders | 0.5% | 11% | 1.1100 | 1.1361 | 1.1483 |
| | 1% | 35% | 0.7185 | 0.6779 | 0.7252 |
| | 2% | 70% | 0.2178 | 0.1593 | 0.1374 |
| | 3% | 86% | −0.0566* | −0.1068* | −0.1280* |

*These are the only figures not significant at the 1% level.

TABLE E2B

Limit Order Returns: Sell Orders
Percentage of filled and unfilled limit orders and horizon security returns for 1-day sell limit orders given at premiums of $\gamma$.

| Order Length | $\gamma$ | Percent Filled/Unfilled | 1-day avg. return | 2-day avg. return | 3-day avg. return |
|---|---|---|---|---|---|
| Filled orders | 0.5% | 0.86 | 0.4942 | 0.4582 | 0.4393 |
| | 1% | 0.59 | 0.9962 | 0.9871 | 0.9788 |
| | 2% | 0.26 | 1.9806 | 1.9860 | 1.9706 |
| | 3% | 0.11 | 3.1486 | 3.1474 | 3.0054 |
| Unfilled | 0.5% | 0.14 | −1.0601 | −1.2876 | −1.5194 |
| Orders | 1% | 0.41 | −0.7614 | −0.9132 | −1.0314 |
| | 2% | 0.74 | −0.3345 | −0.4251 | −0.4891 |
| | 3% | 0.89 | −0.0656* | −0.1331* | −0.1734* |

*These are the only figures not significant at the 1% level.

TABLE E2C

Probit Regressions for the 100% fill if touch case
Probit Regression on whether a 1-day buy limit order fills. Standard errors are given in parentheses. All coefficients are significant at the 1% level. The variables are defined in Table 2.

| Variable | Regression 1 | Regression 2 |
|---|---|---|
| INTERCEPT | 2.1793 | 2.3073 |
| | (.2393) | (.2466) |
| PERSPRD | 186.42 | 186.81 |
| | (11.43) | (11.46) |
| GAM | −428.56 | −445.60 |
| | (52.33) | (53.73) |
| GAM2 | 15027.64 | 15,252.91 |
| | (3,247.26) | (3,322.10) |
| GAM3 | −237,304.84 | −232,712.76 |
| | (59,748.06) | (60,984.91) |
| RET | −0.6678 | — |
| | (.0267) | |
| RET2 | .1582 | — |
| | (.0108) | |
| RET3 | −0.0089 | — |
| | (.0011) | |
| SPEC | — | −0.6871 |
| | | (.0274) |
| SPEC2 | — | .1275 |
| | | (.0087) |
| SPEC3 | — | −0.0063 |
| | | (.0008) |
| MKT | — | −0.9762 |
| | | (.0624) |
| Log Likelihood | −1313.78 | −1276.14 |
| Number of Observations | 4300 | 4300 |

TABLE E2D

Optimal Limit Order Discounts as a Percentage of Principal Price for Various Levels of Risk Aversion if an Order Fills 100% at a Touch
Optimal limit order discount, $\gamma$, calculated by maximizing equation (24) using the empirically estimated distribution for fill rates given in regression 1 of Table 4. Optimizations are over varying investor beliefs about expected stock returns, and risk parameters $\lambda$. Forced limit order strategies assume that the security is purchased at the end of the trading horizon if the limit order does not fill. Optional limit orders assume that the investor does not purchase the security if limit order does not fill. The standard deviation, $\sigma$, of returns matches the sample at 1.6. An uninformed investor would expect returns equal to half the bid-ask spread, or -0.275%.

| Expected Daily Stock Return | Forced Limit Order Strategy Single Stock Purchase | | | Optional Limit Order Strategy Single Stock Purchase | | |
|---|---|---|---|---|---|---|
| | $\lambda = 0$ $\sigma = 1.6$ | $\lambda = 0.10$ $\sigma = 1.6$ | $\lambda = 0.25$ $\sigma = 1.6$ | $\lambda = 0$ $\sigma = 1.6$ | $\lambda = 0.10$ $\sigma = 1.6$ | $\lambda = 0.25$ $\sigma = 1.6$ |
| −0.8% | 2.59% | 2.68% | 2.80% | 2.92% | 3.00% | 3.00% |
| −0.4% | 0.67% | 0.75% | 2.45% | 2.55% | 2.67% | 2.83% |
| −0.275% | 0.61% | 0.66% | 0.80% | 0.71% | 2.53% | 2.72% |
| 0.0% | 0.51% | 0.54% | 0.60% | 0.56% | 0.61% | 0.75% |

TABLE E2D-continued

Optimal Limit Order Discounts as a Percentage of Principal Price for Various Levels of Risk Aversion if an Order Fills 100% at a Touch
Optimal limit order discount, γ, calculated by maximizing equation (24) using the empirically estimated distribution for fill rates given in regression 1 of Table 4. Optimizations are over varying investor beliefs about expected stock returns, and risk parameters λ. Forced limit order strategies assume that the security is purchased at the end of the trading horizon if the limit order does not fill. Optional limit orders assume that the investor does not purchase the security if limit order does not fill. The standard deviation, σ, of returns matches the sample at 1.6. An uninformed investor would expect returns equal to half the bid-ask spread, or -0.275%.

| Expected Daily Stock Return | Forced Limit Order Strategy Single Stock Purchase | | | Optional Limit Order Strategy Single Stock Purchase | | |
|---|---|---|---|---|---|---|
| | $\lambda = 0$ $\sigma = 1.6$ | $\lambda = 0.10$ $\sigma = 1.6$ | $\lambda = 0.25$ $\sigma = 1.6$ | $\lambda = 0$ $\sigma = 1.6$ | $\lambda = 0.10$ $\sigma = 1.6$ | $\lambda = 0.25$ $\sigma = 1.6$ |
| 0.4% | 0.42% | 0.43% | 0.45% | 0.44% | 0.46% | 0.51% |
| 0.8% | 0.35% | 0.35% | 0.36% | 0.36% | 0.37% | 0.38% |
| 1.2% | 0.30% | 0.30% | 0.29% | 0.31% | 0.31% | 0.31% |
| 1.6% | 0.27% | 0.26% | 0.23% | 0.26% | 0.26% | 0.24% |
| 2.0% | 0.24% | 0.23% | 0.18% | 0.23% | 0.22% | 0.19% |
| 2.4% | 0.23% | 0.20% | 0.14% | 0.21% | 0.19% | 0.14% |

TABLE E2E

Forced & Optional Purchase Strategy Returns for 100% fill at touch
All returns are a percentage of offer price evaluated at the next day's midpoint. The forced strategy includes the additional cost of purchasing the security if the limit order does not execute. The optional strategy earns zero returns if the limit order does not execute. p-values are calculated using a t-test on the null hypothesis that the means are equal under the assumption of unequal variances.

| γ | Avg. Return Market Buy Order | Avg. Return Forced-Execution Strategy | p-value for $H_0$: Forced = Market | Average Return Optional - Execution Strategy | p-value for $H_0$: Optional = Market |
|---|---|---|---|---|---|
| 0.5% | -0.4052 | -0.0860 | .0001 | -0.0736 | .0001 |
| 1.0% | -0.4052 | -0.0770 | .0001 | 0.0069 | .0001 |
| 2.0% | -0.4052 | -0.1652 | .0001 | 0.0373 | .0001 |
| 3.0% | -0.4052 | -0.2055 | .0001 | 0.0541 | .0001 |

Example 3

Lower Bound Analysis

Below is the analysis repeated using the least generous fill-rate assumption. That is, if the price stream shows that the price for the day touched but did not cross the limit order price, we assume that the limit order does not fill. In this example we assume limit orders fill 100% with a price cross, 0% with a price touch, and 0% with no touch.

TABLE E3A

Limit Order Returns: Purchase Orders
Percentage of filled and unfilled limit orders and horizon security returns for 1-day buy limit orders given at discounts of γ. The sample is 100 S & P 500 stocks traded on the NYSE from July and August 1996.

| Order Length | γ | Percent Filled/ Unfilled | 1-day avg. return | 2-day avg. return | 3-day avg. return |
|---|---|---|---|---|---|
| Filled orders | 0.5% | 75% | -0.8562 | -0.9471 | -1.0394 |
| | 1% | 49% | -1.3607 | -1.4768 | -1.5898 |
| | 2% | 22% | -2.1739 | -2.2696 | -2.3883 |
| | 3% | 10% | -2.9294 | -2.9350 | -3.0287 |
| Unfilled Orders | 0.5% | 25% | 0.9197 | 0.9410 | 1.0378 |
| | 1% | 51% | 0.5239 | 0.5015 | 0.5224 |
| | 2% | 78% | 0.1031 | 0.0526* | 0.0336* |
| | 3% | 90% | -0.1262 | -0.1874 | -0.2260 |

TABLE E3B

Limit Order Returns: Sell Orders
Percentage of filled and unfilled limit orders and horizon security returns for 1-day sell limit orders given at premiums of γ.

| Order Length | γ | Percent Filled/ Unfilled | 1-day avg. return | 2-day avg. return | 3-day avg. return |
|---|---|---|---|---|---|
| Filled orders | 0.5% | 69% | 0.8275 | 0.8068 | 0.7982 |
| | 1% | 45% | 1.3946 | 1.3873 | 1.3789 |
| | 2% | 18% | 2.4736 | 2.4942 | 2.4446 |
| | 3% | 7% | 3.6608 | 3.4577 | 3.2316 |
| Unfilled Orders | 0.5% | 31% | -0.9383 | -1.1120 | -1.2598 |
| | 1% | 55% | -0.6314 | -0.7500 | -0.8353 |
| | 2% | 82% | -0.2086 | -0.2901 | -0.3441 |
| | 3% | 93% | 0.0035* | -0.0452* | -0.0813* |

*These are the only figures not significant at the 1% level.

TABLE E3C

Probit Regressions for the 0% fill if touch case
Probit Regression on whether a 1-day buy limit order fills. Standard errors are given in parentheses. All coefficients are significant at the 1% level. Variables are defined in Table 2 above.

| Variable | Regression 1 | Regression 2 |
|---|---|---|
| INTERCEPT | 1.4900 | 1.5524 |
| | (0.1927) | (0.1966) |
| PERSPRD | 71.35 | 73.19 |
| | (9.13) | (9.27) |
| GAM | -320.19 | -342.85 |
| | (44.92) | (45.70) |
| GAM2 | 10,411.45 | 11,496.82 |
| | (2,941.57) | (2,981.07) |
| GAM3 | -158,777.0 | -176,232.7 |
| | (56,217.6) | (56,855.3) |
| RET | -0.6377 | — |
| | (0.0237) | |
| RET2 | 0.1403 | — |
| | (0.0086) | |
| RET3 | -0.0061 | — |
| | (0.0005) | |
| SPEC | — | -0.6716 |
| | | (0.0248) |
| SPEC2 | — | 0.1192 |
| | | (0.0072) |
| SPEC3 | — | -0.0046 |
| | | (0.0004) |
| MKT | — | -0.9440 |
| | | (0.0454) |

TABLE E3C-continued

Probit Regressions for the 0% fill if touch case
Probit Regression on whether a 1-day buy limit order fills. Standard errors are given in parentheses. All coefficients are significant at the 1% level.
Variables are defined in Table 2 above.

| Variable | Regression 1 | Regression 2 |
| --- | --- | --- |
| Log Likelihood | −1,421.12 | −1,378.09 |
| Number of Observations | 4300 | 4300 |

TABLE E3D

Optimal Limit Order Discounts as a Percentage of Principal Price for Various Levels of Risk Aversion if an Order Fills 0% at a Touch
Optimal limit order discount, γ, calculated by maximizing equation (10) using the empirically estimated distribution for fill rates given in regression 1 of Table 4. Optimizations are over varying investor beliefs about expected stock returns, and risk parameters λ. Forced limit order strategies assume that the security is purchased at the end of the trading horizon if the limit order does not fill. Optional limit orders assume that the investor does not purchase the security if limit order does not fill. The standard deviation, σ, of returns matches the sample at 1.6. An uninformed investor would expect returns equal to half the bid-ask spread, or −0.275%.

| | Forced Limit Order Strategy Single Stock Purchase | | | Optional Limit Order Strategy Single Stock Purchase | | |
| --- | --- | --- | --- | --- | --- | --- |
| Expected Daily Stock Return | $\lambda = 0$ $\sigma = 1.6$ | $\lambda = 0.10$ $\sigma = 1.6$ | $\lambda = 0.25$ $\sigma = 1.6$ | $\lambda = 0$ $\sigma = 1.6$ | $\lambda = 0.10$ $\sigma = 1.6$ | $\lambda = 0.25$ $\sigma = 1.6$ |
| −0.8% | 3.00% | 3.00% | 3.00% | 3.00% | 3.00% | 3.00% |
| −0.4% | 2.75% | 2.83% | 2.93% | 3.00% | 3.00% | 3.00% |
| −0.275% | 2.64% | 2.72% | 2.84% | 2.99% | 3.00% | 3.00% |
| 0.0% | 0.0% | 0.31% | 2.61% | 0.0% | 0.0% | 0.31% |
| 0.4% | 0.0% | 0.0% | 0.0% | 0.0% | 0.0% | 0.0% |
| 0.8% | 0.0% | 0.0% | 0.0% | 0.0% | 0.0% | 0.0% |
| 1.2% | 0.0% | 0.0% | 0.0% | 0.0% | 0.0% | 0.0% |
| 1.6% | 0.0% | 0.0% | 0.0% | 0.0% | 0.0% | 0.0% |
| 2.0% | 0.0% | 0.0% | 0.0% | 0.0% | 0.0% | 0.0% |
| 2.4% | 0.0% | 0.0% | 0.0% | 0.0% | 0.0% | 0.0% |

TABLE E3E

Forced & Optional Purchase Strategy Returns for 0% fill at touch
All returns are a percentage of offer price evaluated at the next day's midpoint. The forced strategy includes the additional cost of purchasing the security if the limit order does not execute. The optional strategy earns zero returns if the limit order does not execute. p-values are calculated using a t-test on the null hypothesis that the means are equal under the assumption of unequal variances.

| γ | Avg. Return Market Buy Order | Avg. Return Forced-Execution Strategy | p-value for $H_0$: Forced = Market | Average Return Optional - Execution Strategy | p-value for $H_0$: Optional = Market |
| --- | --- | --- | --- | --- | --- |
| 0.5% | −0.4052 | −0.3232 | 0.0444 | −0.2633 | 0.0001 |
| 1.0% | −0.4052 | −0.3199 | 0.0240 | −0.1746 | 0.0001 |
| 2.0% | −0.4052 | −0.2744 | 0.0001 | −0.0396 | 0.0001 |
| 3.0% | −0.4052 | −0.2755 | 0.0001 | 0.0050 | 0.0001 |

REFERENCES

1. Angel, James J., 1994, Limit versus market orders, Georgetown working paper.
2. Bertsimas, D. and Andrew Lo, 1996, Optimal Control of Execution Costs, MIT working paper.
3. Chakravarty, Sugato and Craig W. Holden, 1994, An integrated model of market and limit orders, *Journal of Financial Intermediation*, 4, 213–241.
4. Cohen, Kalman J., Steven Maier, Robert A. Schwartz, and David K. Whitcomb, 1981, Transaction costs, order placement strategy and existence of the bid-ask spread, *Journal of Political Economy*, 89, 287–305.
5. Copeland, Thomas E. and Dan Galai, 1983, Information effects on the bid-ask spread, *The Journal of Finance*, 38, 1457–1469.
6. Fama, Eugene F., 1970, Multiperiod Consumption-Investment Decisions, *American Economic Review*, 60, 163–174.
7. Fama, Eugene F. and Kenneth R. French, 1993, Common risk factors in the returns on stocks and bonds, *Journal of Financial Economics*, 33, 3–56.
8. Figlewski, Stephen, 1997, Forecasting volatility, *Financial Markets, Institutions & Instruments*, 6 (1), 1–88.
9. Glosten, Lawrence R., 1994, Is the electronic open limit order book inevitable?, *Journal of Finance*, 49, 1127–1161.
10. Handa, Puneet and Robert A. Schwartz, 1996, Limit order trading, *Journal of Finance*, 51, 1835–1861.
11. Harris, Lawrence. 1998, Optimal dynamic order submission strategies in some stylized trading problems, forthcoming, *Financial Markets, Institutions & Instruments*.
12. Harris, Lawrence and Joel Hasbrouck, 1996, Market vs. limit orders: The SuperDot evidence on order submission strategy, *Journal of Financial and Quantitative Analysis*, 31, 213–231.
13. Hausman, J., A. Lo, and C. MacKinlay, 1992, An ordered probit analysis of transaction stock prices, *Journal of Financial Economics*, 31, 319–379.
14. Lin, Ji-Chai and Michael S. Rozeff, 1994, Variance, return, and high-low price spreads, *The Journal of Financial Research*, 17 (3), 301–319.
15. Lo, Andrew, Craig MacKinley, and June Zhang, 1997, Econometric models of limit order executions, MIT Laboratory of Financial Engineering Working Paper No. LFE-1031-97.
16. Madhavan, Ananth and Minder Cheng, 1997, In search of liquidity: Block trades in the upstairs and downstairs markets, *The Review of Financial Studies*, 10, 175–203.

17. Merton, R., 1971, Optimum Consumption and Portfolio Rules in a Continuous-Time
18. Model, *Journal of Economic Theory*, 3, 373–413.
19. Pratt, John W., 1964, Risk aversion in the small and in the large, *Econometrica*, 32, 83–97.
20. Simaana, Yusif, Daniel G. Weaver, and David K. Whitcomb, 1998, The Quotation Behavior of ENCs and Nasdaq Market Makers, Fordham University working paper.
21. Stoll, Hans R., 1978, The supply of dealer services in securities markets, *The Journal of Finance*, 33, 1133–1151.
22. Varian, Hal R., 1992 *Microeconomic Theory* (3$^{rd}$ Ed., Norton, New York , 1992).

We claim:

1. A method of determining the discounts, Γ, from the principal price of each of N securities at which to place an order during a time period starting at time t and ending at time t+1, wherein the order is subject to uncertain execution for each security, so as to maximize the expected utility of wealth of an investor, the method comprising determining the value of Γ for which EU(W) is a maximum from the equation:

$$\max_{\Gamma} EU(W) = EU\left\{ \left( \tilde{R}_{Filled} P \right)^T \tilde{X}(\Gamma) + \left( \tilde{R}^\dagger P \right)^T \left( i - \tilde{X}(\Gamma) \right) + \left( i + \tilde{R}_w \right)^T W_{non-trade} + i^T W_{trade} \right\}$$

wherein

EU(W) is the expected value of the utility function U;

N is the number of unique securities in the union of securities owned by the investor at time t and the securities for which orders are to be placed;

Γ is a column vector whose elements are the order discount, $\gamma_j$, for each security;

P is a column vector of length N whose elements are $(p_{a,t})_j \cdot s_{j,t}$ when the order is a purchase and $(p_{b,t})_j$ when the order is a sale, wherein $(p_{a,t})_j$ and $(p_{b,t})_j$ are the principal prices of security j of the N securities at time t for purchase orders and for sale orders, respectively, adjusted for splits and dividends when the securities are equities, and $s_{j,t}$ are the number of shares of security j and the $s_{j,t}$ are independently a positive number or, when there is no order for security j, zero;

$\tilde{X}$ is a column vector of length N whose elements, $\tilde{x}_j$, are contained in the closed interval [0,1] and are the fraction of the order that is executed at discount $\gamma_j$;

$\tilde{R}^\dagger$ is $\tilde{R}_{Forced}$ if execution of the order is forced at the end of the time period or $\tilde{R}_{Optional}$ if execution of the order is optional at the end of the time period, t+1;

$\tilde{R}_{Filled}$, $\tilde{R}_{Forced}$, and $\tilde{R}_{Optional}$ are N×N diagonal matrices whose non-diagonal elements are zero and whose diagonal elements are real, random variables, $(\tilde{r}_{Filled})_{j,j}$, $(\tilde{r}_{Forced})_{j,j}$, and $(\tilde{r}_{Optional})_{j,j}$, respectively, and are the expected returns of each of the N securities when the order is filled during the time period, forced to be executed by the end of the time period, and optionally executable by the end of the time period, respectively;

$\tilde{R}_w$ is a column vector of length N whose elements, $(\tilde{r}_w)_j$, are the returns at time t+1 on each of the j securities as given by $$(\tilde{r}_w)_j = \frac{(p_{m,t+1})_j - (p_{a,t})_j}{(p_{a,t})_j},$$

$W_{non-trade}$ is a column vector of length N whose elements, $(w_{non-trade})_j$, are the dollar values of each of the N securities already in the investor's possession, net of desired orders, and wherein the $(w_{non-trade})_j$ independently are a positive number, zero, or a negative number; and $W_{trade}$ is a column vector of length N whose elements, $(w_{trade})_j$, are the dollar values of each of the N securities already in the investor's possession which are to be traded and wherein the $(w_{trade})_j$ independently are a positive number, zero, or a negative number; and i is a column vector of length N whose elements are each 1, N is an integer value of at least 1 or more, j is an integer from 1 to N, and the superscript T indicates the transpose of a matrix.

2. The method according to claim 1 wherein N=1 wherein:

$$\max_{\gamma} EU(W) = EU\{\tilde{r}_{Filled} p_{a,t} s \tilde{x}(\gamma) + \tilde{r}^\dagger p_{a,t} s (1 - \tilde{x}(\gamma)) + (1 + \tilde{r}_w) w_{non-trade} + w_{trade}\}$$

wherein $p^\dagger$ is $p_{a,t}$ when the order is a purchase and $p_{b,t}$ when the order is a sale;

w is a scalar equal to the total dollar value of assets held in the portfolio at time t;

$\tilde{r}^\dagger$ is $\tilde{r}_{Forced}$ if execution of the order is forced at the end of the time period or $\tilde{r}_{Optional}$ if execution of the order is optional at the end of the time period at time t+1;

$\tilde{r}_{Filled}$, $\tilde{r}_{Forced}$, and $\tilde{r}_{Optional}$ are $(\tilde{r}_{Filled})_{l,l}$, $(\tilde{r}_{Forced})_{l,l}$, and $(\tilde{r}_{Optional})_{l,l}$, respectively, and are the expected returns of the securities when the order is executed during the time period, forced to be executed by the end of the time period, and optionally executable by the end of the time period, respectively;

$\tilde{r}_w$ is the portfolio return for the period t to t+1 of the assets held in the portfolio at time t;

$p_{a,t}$ is the principal price of the security, adjusted for splits and dividends, for the purchase of the security;

$p_{b,t}$ is the principal price of the security, adjusted for splits and dividends, for the sale of the security;

s is the number of shares of the security being traded; and $\tilde{x}(\gamma)$ is the fraction of the order that is filled at discount $\gamma$.

3. The method according to claim 1 wherein the elements $(\tilde{r}_w)_j$ of $\tilde{R}_w$ are constant or zero.

4. The method according to claim 1 wherein the $\tilde{x}_j$ are independently 0 or 1.

5. The method according to claim 1 wherein each of the $s_{j,t}$ are 1.

6. The method of claim 1 or 2 wherein the order is a purchase order and the diagonal elements of the returns are given by $$(\tilde{r}_{Filled})_{j,j} = (\tilde{r}_{Filled\_P})_{j,j} = (\tilde{r}_P)_j + \frac{\gamma_j}{(p_{a,t})_j},$$

-continued $$(\tilde{r}_{Forced})_{j,j} = (\tilde{r}_{Forced\_P})_{j,j} = \frac{(\tilde{p}_{m,t+1})_j - (\tilde{p}_{a,t+1})_j}{(p_{a,t})_j}, \text{ and}$$

$$(\tilde{r}_{Optional\_P})_j = 0,$$

and wherein $(\tilde{r}_P)_j = \frac{(\tilde{p}_{m,t+1})_j - (p_{a,t})_j}{(p_{a,t})_j},$ and $(\tilde{p}_{a,t+1})_j$ is the principal price of security j at time t+1, $(p_{a,t})_j$ is the principal price of security j a time t, and $(\tilde{p}_{m,t+1})_j$ is the valuation price at time t+1, and wherein all prices are adjusted for splits and dividends when the securities are equities.

7. The method of claim 1 or 2 wherein the order is a short sale order and the diagonal elements of the returns are given by $$(\tilde{r}_{Filled})_{j,j} = (\tilde{r}_{Filled\_S})_{j,j} = (\tilde{r}_s)_j + \frac{\gamma_j}{(p_{b,t})_j},$$

$$(\tilde{r}_{Forced})_{j,j} = (\tilde{r}_{Forced\_S})_{j,j} = \frac{(\tilde{p}_{b,t+1})_j - (\tilde{p}_{m,t+1})_j}{(p_{b,t})_j}, \text{ and}$$

$$(\tilde{r}_{Optional})_{j,j} = (\tilde{r}_{Optional\_S})_{j,} = 0,$$

and wherein $(\tilde{r}_S)_j = \frac{(p_{b,t})_j - (\tilde{p}_{m,t+1})_j}{(p_{b,t})_j},$ $(\tilde{p}_{b,t+1})_j$ is the principal price of security j at time t+1, $(p_{b,t})_j$ is the principal price of security j a time t, and $(\tilde{p}_{m,t+1})_j$ is the valuation price at time t+1, and wherein all prices are adjusted for splits and dividends when the securities are equities.

8. The method of claim 1 or 2 wherein the order is a long sale order and the diagonal elements of the returns are given by $$(\tilde{r}_{Filled})_{j,j} = (\tilde{r}_{Filled\_LS})_{j,} = (\tilde{r}_{LS})_j + \frac{\gamma_j}{(p_{b,t})_j},$$

$$(\tilde{r}_{Forced})_{j,j} = (\tilde{r}_{Forced\_LS})_{j,j} = \frac{(\tilde{p}_{b,t+1})_j - (\tilde{p}_{m,t})_j}{(p_{b,t})_j}, \text{ and}$$

$$(\tilde{r}_{Optional})_{j,j} = (\tilde{r}_{Optional\_LS})_{j,j} = \frac{(\tilde{p}_{m,t+1})_j - (p_{m,t})_j}{(p_{b,t})_j},$$

$$(\tilde{r}_{LS})_j = 0,$$

and wherein $(\tilde{p}_{b,t+1})_j$ is the principal price of security j at time t+1, $(p_{b,t})_j$ is the principal price of security j a time t, and $(\tilde{p}_{m,t+1})_j$ is the valuation price at time t+1, and wherein all prices are adjusted for splits and dividends when the securities are equities.

9. A method of determining the discount, $\Gamma$, from the principal price of each of N securities at which to place an order for one or more securities, wherein the order is subject to uncertain execution, for each security to maximize the expected utility of wealth of an investor, the method comprising determining the value of $\Gamma$ for which the certainty equivalent, CE, of the risk is used in maximization of the utility function:

$$\max_{\Gamma} CE = E(\tilde{G}) - \frac{1}{2}\Psi(w)E(\tilde{G}^2),$$

wherein $\tilde{G} = (\tilde{R}_{Filled}P)^T\tilde{X}(\Gamma) + \tilde{R}^\dagger P^T(i - \tilde{X}(\Gamma)) + \tilde{R}_w^T W_{non-trade};$ $E(\tilde{G})$ is the expectation value $\tilde{G}$;

N is the number of unique securities in the union of securities owned by the investor at time t and the securities for which orders are to be placed;

$\Gamma$ is a column vector of length N whose elements are the order discount, $\gamma_j$, for each security;

P is a column vector of length N whose elements are $(p_{a,t})_j \cdot s_{j,t}$ when the order is a purchase and $(p_{b,t})_j$ when the order is a sale, wherein $(p_{a,t})_j$ and $(p_{b,t})_j$ are the principal price of security j of the N securities at time t for purchase orders and for sale orders, respectively, adjusted for splits and dividends when the securities are equities, and $s_{j,t}$ are the number of shares of security j at time t and the $s_{j,t}$ are independently a positive number or, when there is no order for security j, zero, $\tilde{X}$ is a column vector of length N whose elements, $\tilde{x}_j$, are contained in the closed interval [0,1] and are the fraction of the order that is executed at discount $\gamma_j$;

$\tilde{R}^\dagger$ is $\tilde{R}_{Forced}$ if execution of the order is forced at the end of the time period or $\tilde{R}_{Optional}$ if execution of the order is optional at the end of the time period, t+1;

$\tilde{R}_{Filled}$, $\tilde{R}_{Forced}$, and $\tilde{R}_{Optional}$ are N×N diagonal matrices whose elements are real, random variables, $(\tilde{r}_{Filled})_{j,j}$, $(\tilde{r}_{Forced})_{j,j}$, and $(\tilde{r}_{Optional})_{j,j}$, respectively, and are the expected returns of each of the N securities when the order is executed during the time period, forced to be executed by the end of the time period, and optionally executable by the end of the time period, respectively, at the order discount, $\gamma_j$;

$$\Psi(w) = \frac{U''(w)}{U'(w)}$$

is the risk aversion parameter, wherein U(w) is the utility function;

w is a scalar equal to the total dollar value of assets held in the portfolio at time t;

$W_{non-trade}$ is a column vector of length N whose elements, $(w_{non-trade})_j$, are the dollar values of each of the N securities already in the investor's possession, net of desired orders, and wherein the $(w_{non-trade})_j$ independently are a positive number, zero, or a negative number;

$W_{trade}$ is a column vector of length N whose elements, $(w_{trade})_j$, are the dollar values of each of the N securities already in the investor's possession which are to be traded and wherein the $(w_{trade})_j$ independently are a positive number, zero, or a negative number; and $\tilde{R}_w$ is a column vector of length N whose elements, $(\tilde{r}_w)_j$, are the returns at time t+1 on each of the j securities as given by $$(r_w)_j = \frac{(p_{m,t+1})_j - (p_{a,t})_j}{(p_{a,t})_j},$$

i is a column vector of length N whose elements are each 1, N is an integer value of at least 1 or more, j is an integer from 1 to N, and the superscript T indicates the transpose of a matrix.

10. The method according to claim 9 wherein N=1, and:

$$CE = E(\tilde{g}) - \frac{1}{2}\Psi(w)E(\tilde{g}^2)$$

and $$\tilde{g} = \tilde{r}_{Filled} p^{\dagger} s \tilde{x}(\gamma) + \tilde{r}^{\dagger} p^{\dagger} s (1 - \tilde{x}(\gamma)) + \tilde{r}_w w_{non\text{-}trade}$$

$p^\dagger$ is $p_{a,t}$ when the order is a purchase and $p_{b,t}$ when the order is a sale;

$w_{non\text{-}trade}$ is a scalar equal to the total dollar value of securities already in the investor's possession, net of desired orders;

$w_{trade}$ is a scalar equal to the total dollar value of the securities already in the investor's possession which are to be traded; and $\tilde{r}^\dagger$ is $\tilde{r}_{Forced}$ if execution of the order is forced at the end of the time period or $\tilde{r}_{Optional}$ if execution of the order is optional at the end of the time period, t+1;

$\tilde{r}_{Filled}$, $\tilde{r}$Forced, and $\tilde{r}_{Optional}$ are $(\tilde{r}_{Filled})_{l,l}$, $(\tilde{r}_{Forced})_{l,l}$, and $(\tilde{r}_{Optional})_{l,l}$, respectively, and are the expected returns of each of the security when the order is filled during the time period, forced to be executed by the end of the time period, and optionally executable by the end of the time period, respectively;

$\tilde{r}_w$ is the portfolio return for the period t to t+1 of the assets held in the portfolio at time t;

$p_{a,t}$ is the principal price of the security, adjusted for splits and dividends, for the purchase of the security;

$p_{b,t}$ is the principal price of the security, adjusted for splits and dividends, for the sale of the security s is the number of shares of the security being traded; and $\tilde{x}(\gamma)$ is the fraction of the order that is executed at discount $\gamma$.

11. The method according to claim 9 wherein the elements of $\tilde{R}_w$ are constant or zero.

12. The method according to claim 9 wherein the risk aversion parameter is a constant, $\lambda$.

13. The method according to claim 9 wherein the $\tilde{x}_j$ are independently 0 or 1.

14. The method according to claim 9 wherein each of the $s_{j,t}$ are 1.

15. The method of claim 9 or 10 wherein the order is a purchase order and the diagonal elements of the returns are given by $$(\tilde{r}_{Filled})_{j,j} = (\tilde{r}_{\text{Filled\_P}})_{j,j} = (\tilde{r}_P)_j + \frac{\gamma_j}{(p_{a,t})_j},$$

$$(\tilde{r}_{Forced})_{j,j} = (\tilde{r}_{\text{Forced\_P}})_{j,j} = \frac{(\tilde{p}_{m,t+1})_j - (\tilde{p}_{a,t+1})_j}{(p_{a,t})_j}, \text{ and}$$

$$(\tilde{r}_{\text{Optional\_P}})_j = 0,$$

and wherein $(\tilde{r}_P)_j = \frac{(\tilde{p}_{m,t+1})_j - (p_{a,t})_j}{(p_{a,t})_j},$ and $(\tilde{p}_{a,t+1})_j$ is the principal price of security j at time t+1, $(p_{a,t})_j$ is the principal price of security j a time t, and $(\tilde{p}_{m,t+1})_j$ is the valuation price at time t+1, and wherein all prices are adjusted for splits and dividends when the securities are equities.

16. The method of claim 9 or 10 wherein the order is a short sale order and the diagonal elements of the returns are given by $$(\tilde{r}_{Filled})_{j,j} = (\tilde{r}_{\text{Filled\_S}})_{j,j} = (\tilde{r}_S)_j + \frac{\gamma_j}{(p_{b,t})_j},$$

$$(\tilde{r}_{Forced})_{j,j} = (\tilde{r}_{\text{Forced\_S}})_{j,j} = \frac{(\tilde{p}_{b,t+1})_j - (\tilde{p}_{m,t+1})_j}{(p_{b,t})_j}, \text{ and}$$

$$(\tilde{r}_{Optional})_{j,j} = (\tilde{r}_{\text{Optional\_S}})_j = 0,$$

and wherein $(\tilde{r}_S)_j = \frac{(p_{b,t})_j - (\tilde{p}_{m,t+1})_j}{(p_{b,t})_j},$ $(\tilde{p}_{b,t+1})_j$ is the principal price of security j at time t+1, $(p_{b,t})_j$ is the principal price of security j a time t, and $(\tilde{p}_{m,t+1})_j$ is the valuation price at time t+1, and wherein all prices are adjusted for splits and dividends when the securities are equities.

17. The method of claim 9 or 10 wherein the order is a long sale order and the diagonal elements of the returns are given by $$(\tilde{r}_{Filled})_{j,j} = (\tilde{r}_{\text{Filled\_LS}})_j = (\tilde{r}_{LS})_j + \frac{\gamma_j}{(p_{b,t})_j},$$

$$(\tilde{r}_{Forced})_{j,j} = (\tilde{r}_{\text{Forced\_LS}})_{j,j} = \frac{(\tilde{p}_{b,t+1})_j - (p_{m,t})_j}{(p_{b,t})_j}, \text{ and}$$

$$(\tilde{r}_{Optional})_{j,j} = (\tilde{r}_{\text{Optional\_LS}})_{j,j} = \frac{(\tilde{p}_{m,t+1})_j - (p_{m,t})_j}{(p_{b,t})_j},$$

$$(\tilde{r}_{LS})_j = 0,$$

and wherein $(\tilde{p}_{b,t+1})_j$ is the principal price of security j at time t+1, $(p_{b,t})_j$ is the principal price of security j a time t, and $(\tilde{p}_{m,t+1})_j$ is the valuation price at time t+1, and wherein all prices are adjusted for splits and dividends when the securities are equities.

18. The method according to claim 9, wherein $E(\tilde{G})$ is given by $$E(\tilde{G}) = \int_0^1 \int_{-\infty}^{\infty} G(\tilde{r}, \tilde{x}) F(\tilde{r}, \tilde{x}) d\tilde{r} d\tilde{x}$$

wherein $F(\tilde{r},\tilde{x})$ is a joint distribution of the random variables $\tilde{r}$ and $\tilde{x}(\gamma)$.

19. The method according to claim 18 wherein N is 1 and $$\max_{\gamma} CE = \sum_{m=1}^{k} \left( \int_{-\infty}^{\infty} \tilde{g}(\tilde{r}, \beta_m) f(\tilde{r}) P(\tilde{x} \in B_m \mid \gamma, \tilde{r}) d\tilde{r} - \right.$$

-continued $$\frac{1}{2}\lambda \int_{-\infty}^{\infty} \tilde{g}^2(\tilde{r}, \beta_m)f(\tilde{r})P(\tilde{x} \in B_m \mid \gamma, \tilde{r})d\tilde{r}\bigg]$$

$F(\tilde{r},\tilde{x})=f(\tilde{r})P(\tilde{x} \in B_m|\gamma,\tilde{r})$;

$f(\tilde{r})$ is a univariate distribution of $\tilde{r}$;

$\tilde{x}(\gamma)$ is continuous in the closed interval [0,1]

$P(\tilde{x} \in B_m|\gamma,\tilde{r})$ is the probability that $\tilde{x}(\gamma) \in B_m$ for a given $\tilde{r}$ and $\gamma$;

k is an integer equal to or greater than 2;

$B_m$ is the fill rate range, wherein m is an integer of from 1 to k and the group of $B_m$ from m=1 to m=k includes the entire interval [0,1] and each fill rate is contained within only one range; and $\beta_m$ is a fill rate representative of the range in $B_m$ in which $\beta_m$ is contained.

20. The method according to claim 18 wherein N is 1 and $$\max_{\gamma} CE = \int_{-\infty}^{\infty} \tilde{g}(\tilde{r}, 0)f(\tilde{r})P(\tilde{x}=0 \mid \gamma, \tilde{r})d\tilde{r} +$$

$$\int_{-\infty}^{\infty} \tilde{g}(\tilde{r}, 1)f(\tilde{r})P(\tilde{x}=1 \mid \gamma, \tilde{r})d\tilde{r} -$$

$$\frac{1}{2}\Psi(w)\bigg[\int_{-\infty}^{\infty} \tilde{g}^2(\tilde{r}, 0)f(\tilde{r})P(\tilde{x}=0 \mid \gamma, \tilde{r})d\tilde{r} +$$

$$\int_{-\infty}^{\infty} \tilde{g}^2(\tilde{r}, 1)f(\tilde{r})P(\tilde{x}=1 \mid \gamma, \tilde{r})d\tilde{r}\bigg];$$

$F(\tilde{r},\tilde{x})=f(\tilde{r})P(\tilde{x}=a|\gamma,\tilde{r})$;

$f(\tilde{r})$ is a univariate distribution of $\tilde{r}$;

$\tilde{x}(\gamma)$ takes on two discrete outcomes, 0 or 1;

$P(\tilde{x}=a|\gamma,\tilde{r})$ is the probability that $\tilde{x}(\gamma)=a$ for a given $\tilde{r}$ and $\gamma$; and a is 0 or 1.

21. A method of determining the discounts, $\Gamma$, from the principal price of each of N securities at which to place an order during a time period starting at time t and ending at time t+1, wherein the order is subject to uncertain execution for each security, so as to maximize the expected utility of wealth of an investor, the method comprising determining the value of $\Gamma$ for which EU(W) is a maximum, wherein N is an integer value of 1 or more;

$\Gamma$ is a vector having elements $\gamma_j$, wherein $\gamma_j$ is the order discount for the $j^{th}$ security of the N securities for which an order is placed, EU(W) is the expected value of the utility function U;

W is the wealth of the investor at time t+1 given by the sum of:
 a) the dollar value on assets held in the portfolio, but not traded, at time t+1;
 b) the dollar value, at time t, on assets held in the portfolio at time t, which are to be traded;
 c) the dollar value realized when the order is filled at discount $\Gamma$ times the probability that the order for each of the securities will fill; and
 d) if the order did not fill before time t+1, the dollar value realized when (i) the order is forced at time t+1, or (ii) the order is optional at time t+1.

22. The method according to claim 21 wherein the order is a purchase order.

23. The method according to claim 21 wherein the order is a short sale order.

24. The method according to claim 21 wherein the order is a long sale order.

25. A method of determining the discount, $\Gamma$, from the principal price of each of N securities at which to place an order for one or more securities, wherein the order is subject to uncertain execution, for each security to maximize the expected utility of wealth of an investor, the method comprising determining the value of $\Gamma$ for which the certainty equivalent, CE($\tilde{G}$), is a maximum, wherein N is an integer value of 1 or more;

$\Gamma$ is a vector having elements $\gamma_j$, wherein $\gamma_j$ is the order discount for the $j^{th}$ security of the N securities for which an order is placed, $\tilde{G}$ is the gains of the investor given by the sum of:
 a) the change in the dollar value between time t and t+1 of all securities owned by the investor but not traded;
 b) the dollar value realized when the order is filled at discount $\Gamma$ times the probability that the order for each of the securities will fill; and
 c) if the order did not fill before time t+1, the dollar value realized when (i) the order is forced at time t+1, or (ii) the order is optional at time t+1.

26. The method according to claim 24, wherein the certainty equivalent, CE($\tilde{G}$) is approximated by $$CE(\tilde{G})=E(\tilde{G})-\tfrac{1}{2}\Psi(w)E(\tilde{G}^2)$$

wherein $$\Psi(w) = \frac{U''(w)}{U'(w)}$$

is the risk aversion parameter and U(w) is the utility function;

E($\tilde{G}$) is the expectation value of the gains; and

W is the wealth of the investor at time t+1.

27. The method according to claim 26 wherein the risk aversion parameter is constant.

28. The method according to claim 25 wherein the order is a purchase order.

29. The method according to claim 25 wherein the order is a long sale order.

30. The method according to claim 25 wherein the order is a short sale order.

31. A computer readable medium having stored thereon instructions for causing a central processing unit to execute the method of any one of claims 1, 2, 9 or 10.

* * * * *